(12) United States Patent
Kondo et al.

(10) Patent No.: US 7,916,977 B2
(45) Date of Patent: Mar. 29, 2011

(54) DATA PROCESSING APPARATUS, DATA PROCESSING METHOD AND RECORDING MEDIUM

(75) Inventors: Tetsujiro Kondo, Tokyo (JP); Junichi Ishibashi, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/645,643

(22) Filed: Dec. 23, 2009

(65) Prior Publication Data

US 2010/0098344 A1    Apr. 22, 2010

Related U.S. Application Data

(60) Division of application No. 11/361,830, filed on Feb. 23, 2006, now Pat. No. 7,697,732, which is a continuation of application No. 09/700,168, filed as application No. PCT/JP00/01510 on Mar. 13, 2000, now abandoned.

(30) Foreign Application Priority Data

Mar. 12, 1999   (JP) .................................. 11-066635

(51) Int. Cl.
G06K 9/00    (2006.01)
G06K 9/60    (2006.01)
G06F 7/00    (2006.01)
(52) U.S. Cl. ........ 382/305; 382/118; 707/736; 707/737; 707/791; 707/802
(58) Field of Classification Search ................... 382/115, 382/118, 293, 294, 295, 296, 297, 305; 707/736, 707/737, 791, 802
See application file for complete search history.

(56) References Cited

U.S. PATENT DOCUMENTS

| 4,931,869 A | 6/1990 | Amor et al. |
| 4,975,969 A * | 12/1990 | Tal ................................ 382/116 |
| 5,187,751 A | 2/1993 | Tanaka |
| 5,287,275 A | 2/1994 | Kimura |
| 5,329,596 A | 7/1994 | Sakou et al. |
| 5,479,570 A | 12/1995 | Imagawa et al. |
| 5,519,789 A | 5/1996 | Etoh |
| 5,621,858 A | 4/1997 | Stork et al. |
| 5,754,676 A | 5/1998 | Komiya et al. |

(Continued)

FOREIGN PATENT DOCUMENTS

JP    4 81988    3/1992

(Continued)

OTHER PUBLICATIONS

Satoshi Shimada et al., An Evaluation of Identifying a Person from a Facial Image Regardless of the Direction in which the Image is Facing, The Institute of Electronics, Information and Communication Engineers, Nov. 12, 1992, vol. 93, No. 317, p. 23-30.

(Continued)

Primary Examiner — Brian Q Le
(74) Attorney, Agent, or Firm — Frommer Lawrence & Haug LLP; William S. Frommer

(57) ABSTRACT

A group of input image data is determined based on the distance between images of a number of representative faces, prepared from plural templates, and the input image data (correlative values C1 to C5). The number of representative faces is smaller than the number of the templates. An angle of the input image is calculated based on the so-determined group.

10 Claims, 19 Drawing Sheets

U.S. PATENT DOCUMENTS

| | | | |
|---|---|---|---|
| 5,818,954 A * | 10/1998 | Tomono et al. | 382/115 |
| 5,838,816 A | 11/1998 | Holmberg | |
| 5,850,466 A | 12/1998 | Schott | |
| 5,850,470 A | 12/1998 | Kung et al. | |
| 5,859,921 A * | 1/1999 | Suzuki | 382/118 |
| 5,892,837 A | 4/1999 | Luo et al. | |
| 5,912,980 A | 6/1999 | Hunke | |
| 5,966,183 A | 10/1999 | Kondo et al. | |
| 6,064,769 A | 5/2000 | Nakao et al. | |
| 6,154,559 A | 11/2000 | Beardsley | |
| 6,292,575 B1 | 9/2001 | Bortolussi et al. | |
| 6,309,884 B1 | 10/2001 | Cooper et al. | |

FOREIGN PATENT DOCUMENTS

| | | |
|---|---|---|
| JP | 4-239385 | 8/1992 |
| JP | 4 318684 | 11/1992 |
| JP | 6 259565 | 9/1994 |
| JP | 07-023934 | 1/1995 |
| JP | 7-302327 | 11/1995 |
| JP | 10-11583 | 1/1998 |

OTHER PUBLICATIONS

Tomohiko Nakamura et al., A Method to Construct Hierarchical Dictionary for Parametric Eigenspace Method, The Institute of Electronics, Information and Communication Engineers, Mar. 12, 1998, vol. 97, No. 595, p. 81-88.

Kenichi Kanatani, Factorization without Factorization: From Orthographic to Perspective, The Institute of Electronics, Information and Communication Engineers, Jun. 18, 1998, vol. 98, No. 126, p. 1-8.

Brunelli R. et al. "Person identification using multiple cues", Pattern Analysis and Machine Intelligence, I.E.E.E. Transactions, Oct. 1995, vol. 17 pp. 955-966.

Shi-Hong Jeng et al. "An Efficient Approach for Facial Feature Detection Using Geometrical Face Model", Pattern Recognition I.E.E.E. Aug. 1996, vol. 3 pp. 426-430.

Beymer, D.J. "Face Recognition under varying pose", Computer Vision and Pattern Recognition, I.E.E.E. 1994, p. 756-761.

Moghaddam, B et al. "Probabilistic matching for face recognition", Image Analysis and Interpretation, I.E.E.E. 1998, p. 186-191.

* cited by examiner

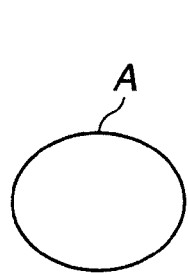
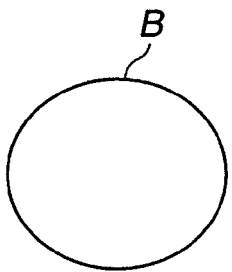
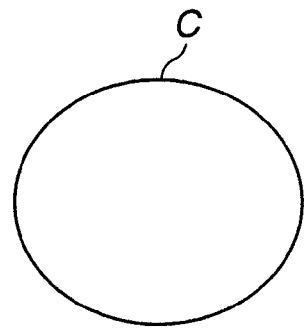
FIG.6A  FIG.6B  FIG.6C
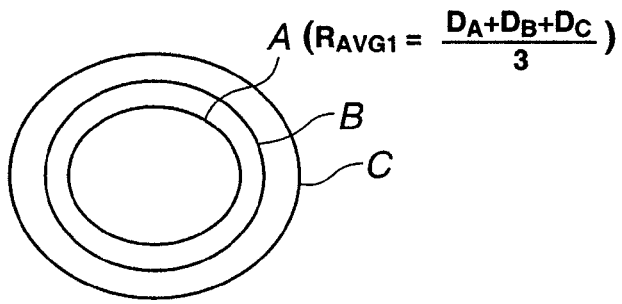
FIG.7
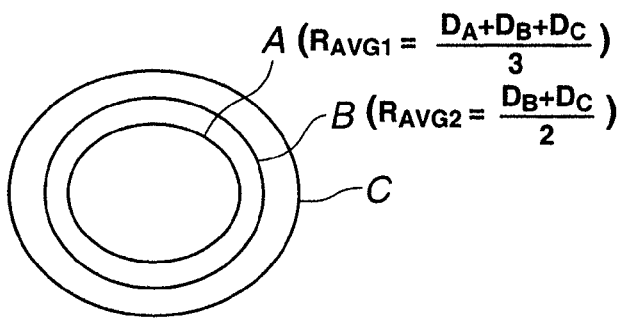
FIG.8
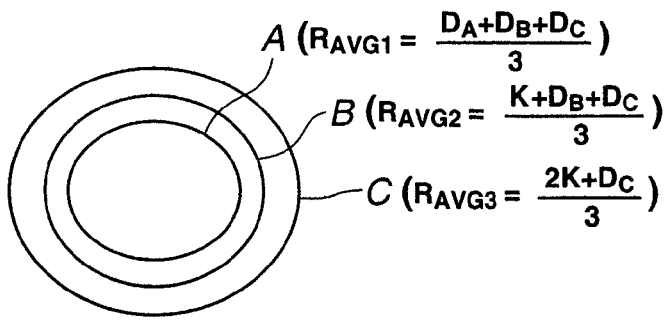
FIG.9

 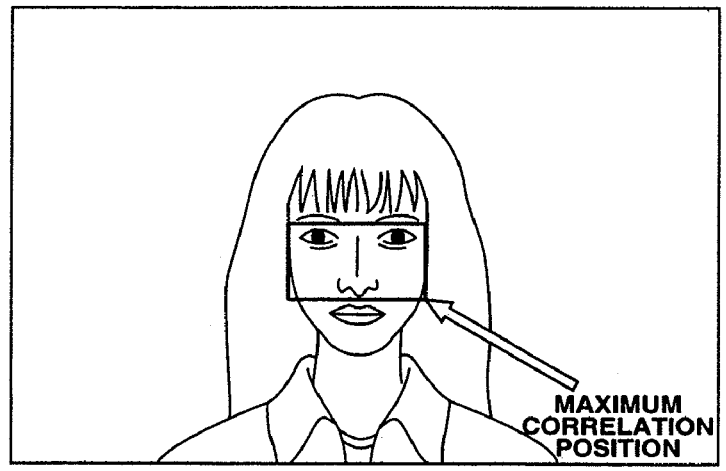
FIG.15A  FIG.15B
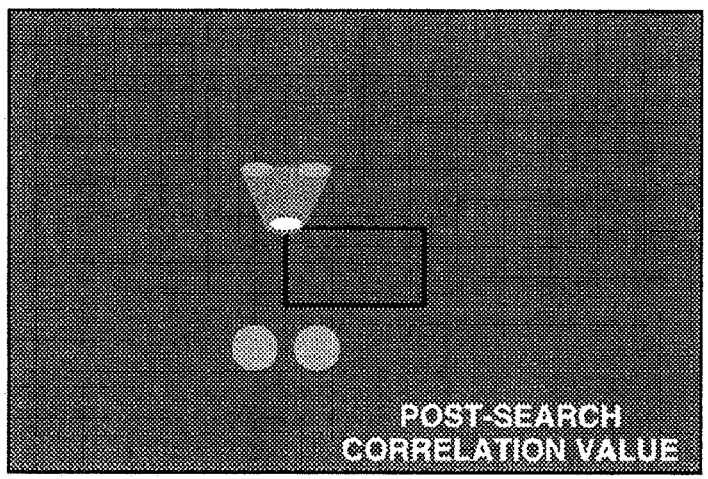
FIG.16

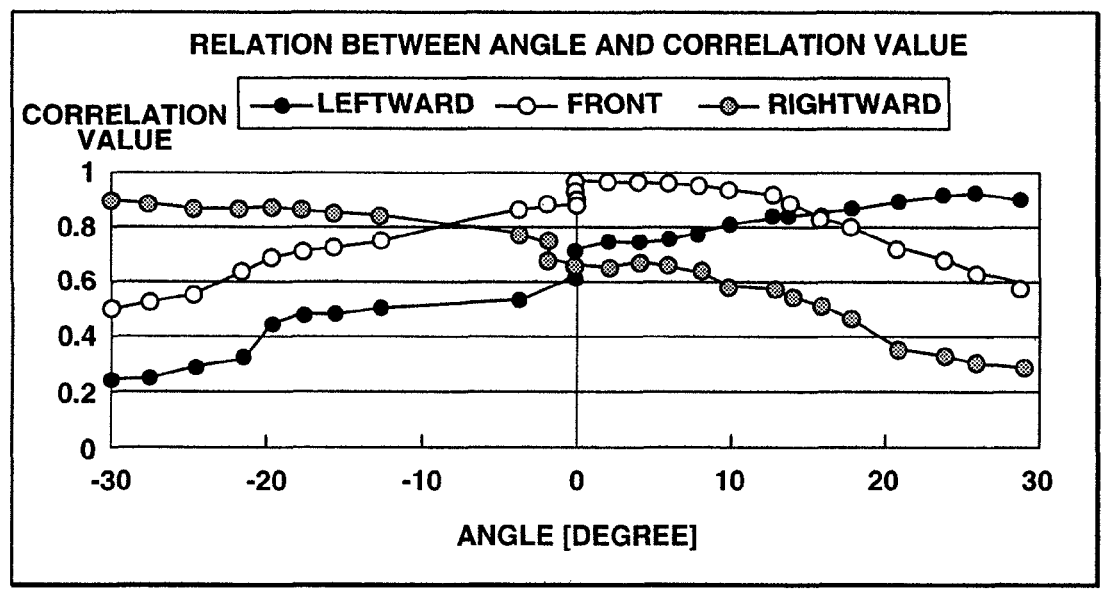
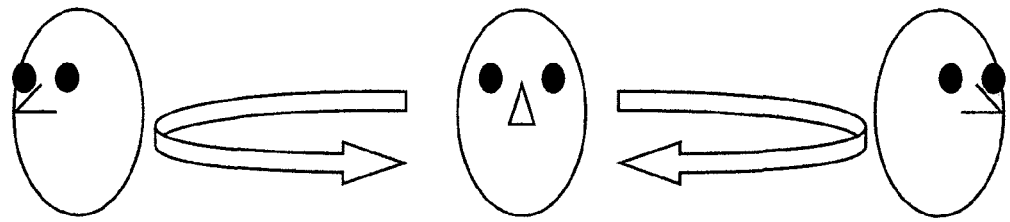
FIG.19

DATA PROCESSING APPARATUS, DATA PROCESSING METHOD AND RECORDING MEDIUM

This is a division of application Ser. No. 11/361,830, filed Feb. 23, 2006, now U.S. Pat. No. 7,697,732 which is a continuation of application Ser. No. 09/700,168, filed Nov. 9, 2000, now abandoned which is a national stage entry from PCT/JP00/01510 filed on Mar. 13, 2000, which is entitled to the priority filing date of Japanese application 11-066635 filed on Mar. 12, 1999, the entirety of which is incorporated herein by reference.

TECHNICAL FIELD

This invention relates to a representative sample generating apparatus, a representative sample generating method, a classification apparatus, a classification method, a coefficient data generating apparatus, a coefficient data generating method, a sample feature data generating apparatus, a sample feature data generating method, a data processing apparatus, a data processing method and a recording medium.

BACKGROUND ART

There is disclosed a method of detecting the orientation of a face of a human being as an object in D-596 "real-time extraction of an image of a human being oriented in a specified direction" on p 7 to 308, Extended Abstract to National Spring Meeting of the Telecommunication Science Association, 1991. In this method, a human face is imaged with a monochromatic camera, and the resulting image data is binary-coded and a human being whose face is directed to the front side is retrieved based on the distance between the center of an area containing eyes, a nose and a mouth and the center of a head. There is also disclosed a method entitled: "application to a command input of a method for detecting a face orientation by an image seen with a sole eye" in a thesis journal D-11 vol. J72-D-II Mo. 9 pages 1441 to 1447, of the Telecommunication Science Association, September 1989. In this method, a human face is modelled as a triangle constituted by three characteristic points, with distances between respective three points being given as known data. From the projection between these three points, the positions of the point of gravity of the triangle and the direction of the normal line are detected as the face orientation in a three-dimensional space.

In the Japanese Laying-Open Patent H-7-23934, it is proposed to find the orientation of the face based on the ratio L/W between the width L of the left head hair area L and the width W of the face area and on the ratio L/R between the width L of the right head hair area and the width R of the right head hair area.

However, if, when the characteristic points of the human face are both eyes and the nose etc, the face is movable over a wide range, both eyes become undetectable when the face is turned beyond a certain threshold angle, as a result of which characteristic points of the human face become unmeasurable.

Moreover, it is difficult to detect the positions of both eyes and the mouth from the head automatically and robustly. Moreover, in the latter method, in which the limiting conditions that the distances of the three points are known from the outset, it becomes difficult to automate the processing.

In the method described in Japanese Laying-Open Patent H-7-23934, in which the image is acquired using an IR camera, it is not only impossible to guess the face orientation from the image photographed using an routine camera, but the cost is raised significantly.

DISCLOSURE OF THE INVENTION

Meanwhile, it is not too much to say that a sensor is general is a device for verifying the similarity. For example, a thermometer compares the current temperature with a previously measured reference temperature to output the closest temperature. The same may apply for the speedometer or an angle gauge. Although these devices give sensor outputs from the point information, the same may be said of sensors handling the non-point information employing the past and future information. Representative of this sort of the sensor is an image sensor. In a majority of sensors, which sense the input image to verify what is the projected object, a previously formed template is compared to an input image to select the most analogous image as a response. In this technique, in which a fixed template is used as a template for comparing input data, it has been difficult to verify which template is to be used to give an optimum decision. It has also been difficult to verify how many templates are to be used to give optimum results.

It is therefore an object of the present invention to enable an optimum template to be produced.

If a grouping operation is to be performed in which an input to a pre-set fixed processing is to be outputted to a classified group, it is difficult to establish an optimum classification method from the outset. Moreover, if the population is deviated at the time of execution from the presumed population, and the processing is a fixed processing, this state cannot be coped with.

It is therefore another object of the present invention to allow for flexible accommodation to the conversion of the population and to enable an optimum classification method to be obtained automatically.

It should be noted that the real world is more replete with non-linear objects, than linear objects. Since linear prediction equations are mainly used for prediction, there is raised no problem if the linear objects only are present in the same class, however, if non-linear objects are included in the same class, and the least square approximation is used in learning, over-fitting, for example, may be produced due to the influence of the non-linear elements, thus leading to the problem that the performance is lowered despite the fact that the number of orders of the prediction equation is increased. There is also raised a problem that an error ascribable to the use of the approximation may occasionally be increased to affect the performance.

It is therefore yet another object of the present invention to reduce the influence of the non-linear elements.

In view of the above-described status of the art, the present invention contemplates to enable the orientation of an object, such as a face orientation, to be estimated accurately over a wide range from an image photographed by a video camera.

According to the present invention, there is provided a representative sample generating apparatus for generating representative sample data of a plurality of groups, based on a plurality of sample data initially classified into the plural groups, in which the apparatus includes group feature data detection means for detecting group feature data representing feature of sample data in each of the groups, distance detection means for detecting the distances between all of the sample data and the group feature data of each group, re-classification means for re-classifying all of the sample data into the plural groups based on the distances, convergence detection means for detecting whether or not the number of sample data classified into groups different from previous groups is converged as a result of re-classification by the re-classification means and decision means for repeating the processing by the group feature data detection means, re-classification means and the convergence detection means until the convergence detection means has detected convergence, and for determining the group feature data of each group prevailing at the time of the convergence as detected by the convergence detection means as representative sample data of each group.

According to the present invention, there is also provided a representative sample generating method for generating representative sample data of a plurality of groups, based on a plurality of sample data initially classified into the plural groups, in which the method includes a step of detecting group feature data representing feature of sample data in each of the groups, a step of detecting the distances between all of the sample data and the group feature data of each group, a step of re-classifying all of the sample data into the plural groups based on the distances, a step of detecting whether or not the number of sample data classified into groups different from previous groups is converged as a result of re-classification by the re-classification step and a step of repeating the processing by the group feature data detection step, re-classification step and the convergence detection step until the convergence detection step has detected convergence, and for determining the group feature data of each group prevailing at the time of the convergence as detected by the convergence detection step as representative sample data of each group.

According to the present invention, there is also provided a recording medium having recorded thereon a computer-controllable program for performing representative sample generating processing for generating representative sample data of a plurality of groups, based on a plurality of sample data initially classified into the plural groups, in which the program includes a step of detecting group feature data representing feature of sample data in each of the groups, a step of detecting the distances between all of the sample data and the group feature data of each group, a step of re-classifying all of the sample data into the plural groups based on the distances, a step of detecting whether or not the number of sample data classified into groups different from previous groups is converged as a result of re-classification by the re-classification step, and a step of repeating the processing by the group feature data detection step, re-classification step and the convergence detection step until the convergence detection step has detected convergence, and for determining the group feature data of each group prevailing at the time of the convergence as detected by the convergence detection step as representative sample data of each group.

According to the present invention, there is also provided a representative sample generating apparatus for generating representative sample data of each of a plurality of groups by classifying the plural sample data, having appended supplementary data indicating respective feature, into the plural groups, in which the apparatus includes initial classification means for initially classifying the plural sample data into plural groups, based on the supplementary data, group feature data detection means for detecting group feature data representing feature of the sample data in each of the groups, distance detection means for detecting the distances between all of the sample data and the group feature data of each group, re-classification means for re-classifying all of the sample data into the plural groups based on the distances, convergence detection means for detecting whether or not the number of sample data classified into groups different from previous groups is converged as a result of re-classification by the re-classification means, and decision means for repeating the processing by the group feature data detection means, the re-classification means and the convergence detection means until the convergence detection means has detected convergence, and for determining the group feature data of each group prevailing at the time of the convergence as detected by the convergence detection means as representative sample data of each group.

According to the present invention, there is also provided a representative sample generating method for generating representative sample data of each of a plurality of groups by classifying the plural sample data, having appended supplementary data indicating respective feature, into the plural groups, in which the method includes a step of initially classifying the plural sample data into plural groups, based on the supplementary data, a step of detecting group feature data representing feature of the sample data in each of the groups, a step of detecting the distances between all of the sample data and the group feature data of each group, a step of re-classifying all of the sample data into the plural groups based on the distances, a step of detecting whether or not the number of sample data classified into groups different from previous groups is converged as a result of re-classification by the re-classification step and a step of repeating the processing by the group feature data detection step, the re-classification step and the convergence detection step until the convergence detection step has detected convergence, and of determining the group feature data of each group prevailing at the time of the convergence as detected by the convergence detection step as representative sample data of each group.

According to the present invention, there is also provided a recording medium having recorded thereon a computer-controllable program for generating representative sample data of each of a plurality of groups by classifying the plural sample data, having appended supplementary data indicating respective feature, into the plural groups, in which the program includes a step of initially classifying the plural sample data into plural groups, based on the supplementary data, a step of detecting group feature data representing feature of the sample data in each of the groups, a step of detecting the distances between all of the sample data and the group feature data of each group, a step of re-classifying all of the sample data into the plural groups based on the distances, a step of detecting whether or not the number of sample data classified into groups different from previous groups is converged as a result of re-classification by the re-classification step and a step of repeating the processing by the group feature data detection step, the re-classification step and the convergence detection step until the convergence detection step has detected convergence, and of determining the group feature data of each group prevailing at the time of the convergence as detected by the convergence detection step as representative sample data of each group.

According to the present invention, there is also provided a classification apparatus for re-classifying sample data initially classified into a plurality of groups, in which the apparatus includes group feature data detection means for detecting group feature data representing feature of the sample data for each of the groups, distance detection means for detecting the distances between all of the sample data and the group feature data of each group, re-classification means for re-classifying all of the sample data into the plural groups based on the distances, convergence detection means for detecting whether or not the number of sample data classified into groups different from previous groups is converged as a result of re-classification by the re-classification means and decision means for repeating the processing by the group feature data detection means, the re-classification means and the convergence detection means until the convergence detection means has detected convergence, and for determining the results of re-classification of each sample data by the re-classification means on convergence detection by the convergence detection means.

According to the present invention, there is provided a classification method for re-classifying sample data initially classified into a plurality of groups, in which the method includes a step of detecting group feature data representing feature of the sample data for each of the groups, a step of detecting the distances between all of the sample data and the group feature data of each group, a step of re-classifying all of the sample data into the plural groups based on the distances, a step of detecting whether or not the number of sample data classified into groups different from previous groups is converged as a result of re-classification by the re-classification step and a step of repeating the processing by the group feature data detection step, the re-classification step and the convergence detection step until the convergence detection step has detected convergence, and of determining the results of re-classification of each sample data by the re-classification step on convergence detection by the convergence detection step.

According to the present invention, there is also provided a recording medium having recorded thereon a computer-controllable program for performing processing of re-classifying a plurality of sample data, based on a plurality of sample data initially classified into plural groups, in which the program includes a step of detecting group feature data representing feature of sample data in each of the groups, a step of detecting the distances between all of the sample data and the group feature data of each group, a step of re-classifying all of the sample data into the plural groups based on the distances, a step of detecting whether or not the number of sample data classified into groups different from previous groups is converged as a result of re-classification by the re-classification step and a step of repeating the processing by the group feature data detection step, re-classification step and the convergence detection step until the convergence detection step has detected convergence, and of determining the results of re-classification of each sample data by the re-classification step on convergence detection in the convergence detection step as ultimate results of classification of each of the groups.

According to the present invention, there is also provided a classification apparatus for classifying plural sample data, having appended supplementary data indicating respective feature, into plural groups, in which the apparatus includes initial classification means for initially classifying the plural sample data into plural groups, based on the supplementary data, group feature data detection means for detecting group feature data representing feature of the sample data in each of the groups, distance detection means for detecting the distances between all of the sample data and the group feature data of each group, re-classification means for re-classifying all of the sample data into the plural groups based on the distances, convergence detection means for detecting whether or not the number of sample data classified into groups different from previous groups is converged as a result of re-classification by the re-classification means, and decision means for repeating the processing by the group feature data detection means, the re-classification means and the convergence detection means until the convergence detection means has detected convergence, and for determining the results of re-classification of each sample data by the re-classification means on convergence detection in the convergence detection step as ultimate results of classification of each of the groups.

According to the present invention, there is also provided a classification method for classifying plural sample data, having appended supplementary data indicating respective feature, into plural groups, in which the method includes a step of initially classifying the plural sample data into plural groups, based on the supplementary data, a step of detecting group feature data representing feature of the sample data in each of the groups, a step of detecting the distances between all of the sample data and the group feature data of each group, a step of re-classifying all of the sample data into the plural groups based on the distances, a step of detecting whether or not the number of sample data classified into groups different from previous groups is converged as a result of re-classification by the re-classification step and a step of repeating the processing by the group feature data detection step, the re-classification step and the convergence detection step until the convergence detection step has detected convergence, and of determining the results of re-classification of each sample data by the re-classification step on convergence detection in the convergence detection step as ultimate results of classification of each of the groups.

According to the present invention, there is also provided a recording medium having recorded thereon a computer-controllable program for classifying plural sample data, having appended supplementary data indicating respective feature, into plural groups, in which the program includes a step of initially classifying the plural sample data into plural groups, based on the supplementary data, a step of detecting group feature data representing feature of the sample data in each of the groups, a step of detecting the distances between all of the sample data and the group feature data of each group, a step of re-classifying all of the sample data into the plural groups based on the distances, a step of detecting whether or not the number of sample data classified into groups different from previous groups is converged as a result of re-classification by the re-classification step and a step of repeating the processing by the group feature data detection step, the re-classification step and the convergence detection step until the convergence detection step has detected convergence, and of determining the results of re-classification of each sample data by the re-classification step on convergence detection in the convergence detection step as ultimate results of classification of each of the groups.

According to the present invention, there is also provided a coefficient data generating apparatus for generating a coefficient data set adapted for generating sample feature data from new sample data not having sample feature data, based on a database in which there are pre-stored the sample feature data and sample data associated with the sample feature data, in which the apparatus includes classification means for classifying the sample data into a plurality of classes, based on the relation thereof with representative sample data which is set to each classification and which is associated with the sample feature data, means for generating, for each class, a normal equation having the values of the sample feature data and the sample data as previously known data and having coefficient data as unknown data and coefficient data generating means for solving the normal equation for each class to generate the coefficient data set for each class.

According to the present invention, there is provided a coefficient data generating method for generating a coefficient data set adapted for generating sample feature data from new sample data not having sample feature data, based on a database in which there are pre-stored the sample feature data and sample data associated with the sample feature data, in which the method includes a step of classifying the sample data into a plurality of classes, based on the relation thereof with representative sample data which is set to each classification and which is associated with the sample feature data, a step of generating, for each class, a normal equation having the values of the sample feature data and the sample data as previously known data and having coefficient data as unknown data and a step of solving the normal equation for each class to generate the coefficient data set for each class.

According to the present invention, there is provided a recording medium having recorded thereon a computer-controllable program adapted for generating a coefficient data set adapted for generating sample feature data from new sample data not having sample feature data, based on a database in which there are pre-stored the sample feature data and sample data associated with the sample feature data, in which the program includes a step of classifying the sample data into a plurality of classes, based on the relation thereof with representative sample data which is set to each classification and which is associated with the sample feature data, a step of generating, for each class, a normal equation having the values of the sample feature data and the sample data as previously known data and having coefficient data as unknown data and a step of solving the normal equation for each class to generate the coefficient data set for each class. According to the present invention, there is also provided a sample feature data generating apparatus including distance detection means for detecting distance between input sample data and each representative sample data generated previously for each of a plurality of groups, classification means for classifying the input sample data into one of the classes, based on the distances of the input sample data from representative sample data of the plural groups and sample feature data generating means for generating sample feature data representing the feature of the input sample data in accordance with a system pre-set for each class.

According to the present invention, there is also provided a sample feature data generating method including a step of detecting distance between input sample data and each representative sample data generated previously for each of a plurality of groups,
a step of classifying the input sample data into one of the classes, based on the distances of the input sample data from representative sample data of the plural groups and a step of generating sample feature data representing the feature of the input sample data in accordance with a system pre-set for each class.

According to the present invention, there is also provided a recording medium having recorded thereon a computer-controllable program adapted for generating sample feature data representing feature of input sample data, in which the program includes a step of detecting distance between input sample data and each representative sample data generated previously for each of a plurality of groups, a step of classifying the input sample data into one of the classes, based on the distances of the input sample data from representative sample data of the plural groups and a step of generating sample feature data representing the feature of the input sample data in accordance with a system pre-set for each class.

According to the present invention, there is also provided a data processing apparatus including a representative sample generating device adapted for repeatedly performing the operations of detecting group feature data based on a plurality of sample data initially classified into a plurality of groups, the group feature data representing feature of sample data in each of the groups, detecting distances between all of the sample data and the group feature data of each group, re-classifying all of the sample data into the plural groups, based on the detected distance, and detecting whether or not the number of sample data classified into groups different from the previous groups has converged, and for determining the group feature data of each group prevailing on detection of the convergence by the re-classification of the number of sample data classified into groups different from the previous group, as representative sample data of each group; and a sample feature data generating device adapted for detecting the distances of input sample data to representative sample data of each group, classifying the input sample data into one of a plurality of classes, based on the distances of the input sample data to the representative sample data of each group, and for generating sample feature data representing feature of the input sample data in accordance with a system pre-set for each class.

According to the present invention, there is also provided a data processing method including a step of repeatedly performing the operations of detecting group feature data based on a plurality of sample data initially classified into a plurality of groups, the group feature data representing feature of sample data in each of the groups, detecting distances between all of the sample data and the group feature data of each group, re-classifying all of the sample data into the plural groups, based on the detected distance, and detecting whether or not the number of sample data classified into groups different from the previous groups has converged, and for determining the group feature data of each group prevailing on detection of the convergence by the re-classification of the number of sample data classified into groups different from the previous group, as representative sample data of each group, and a step of detecting the distances of input sample data to representative sample data of each group, classifying the input sample data into one of a plurality of classes, based on the distances of the input sample data to the representative sample data of each group, and of generating sample feature data representing feature of the input sample data in accordance with a system pre-set for each class.

According to the present invention, there is also provided a recording medium having recorded thereon a computer-controllable program adapted for performing the processing of generating sample feature data representing feature of input sample data, in which the program includes a step of repeatedly performing the operations of detecting group feature data based on a plurality of sample data initially classified into a plurality of groups, the group feature data representing feature of sample data in each of the groups, detecting distances between all of the sample data and the group feature data of each group, re-classifying all of the sample data into the plural groups, based on the detected distance, and detecting whether or not the number of sample data classified into groups different from the previous groups has converged, and determining the group feature data of each group prevailing on detection of the convergence by the re-classification of the number of sample data classified into groups different from the previous group, as representative sample data of each group, and a step of detecting the distances of input sample data to representative sample data of each group, classifying the input sample data into one of a plurality of classes, based on the distances of the input sample data to the representative sample data of each group, and of generating sample feature data representing feature of the input sample data in accordance with a system pre-set for each class.

BRIEF DESCRIPTION OF THE DRAWINGS

FIGS. 6A to 6C schematically show an example of templates having different shapes of the effective area.

FIG. 7 illustrates the averaging processing of the template.

FIG. 8 illustrates the averaging processing of the template.

FIG. 9 illustrates the averaging processing of the template.

FIGS. 15A and 15B illustrate images of the representative faces which give the maximum correlation with the input image.

FIG. 16 illustrates the post-search correlative values.

FIG. 19 shows the relation between the object angle and the correlative values.

BEST MODE FOR CARRYING OUT THE INVENTION

Figure 1:
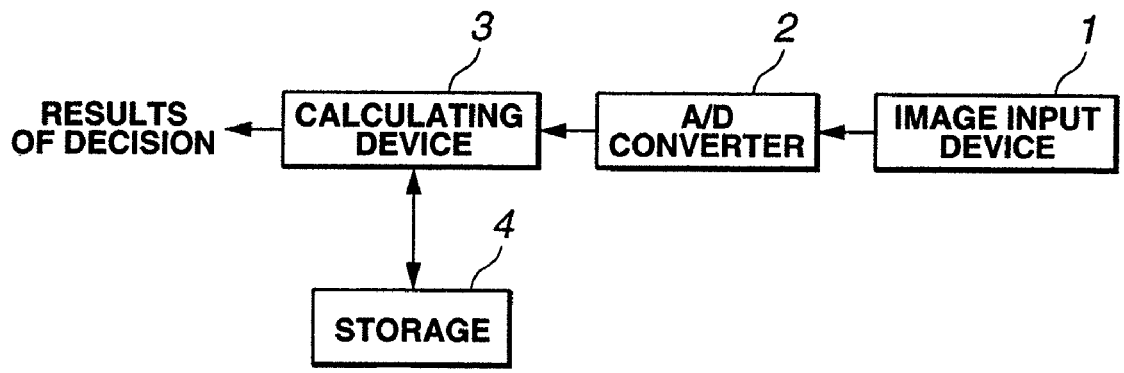
FIG. 1 is a block diagram showing an illustrative structure of an image processing apparatus according to the present invention.

Referring to the drawings, a best mode for carrying out the present invention is explained in detail.

The present invention is applied to a contents selection system configured as shown for example in FIG. 1.

FIG. 1 shows an illustrative structure of an image processing apparatus embodying the present invention. An image processing apparatus 1 is constituted by e.g., a video camera, and images an object. An A/D converter 2 A/D converts image data outputted by the image processing apparatus 1 to send the converted image data to a processing device 3. A memory device 4 is constituted e.g., by a hard disc and stores image data processed by a processing device 3 and image data as templates.

Figure 2:
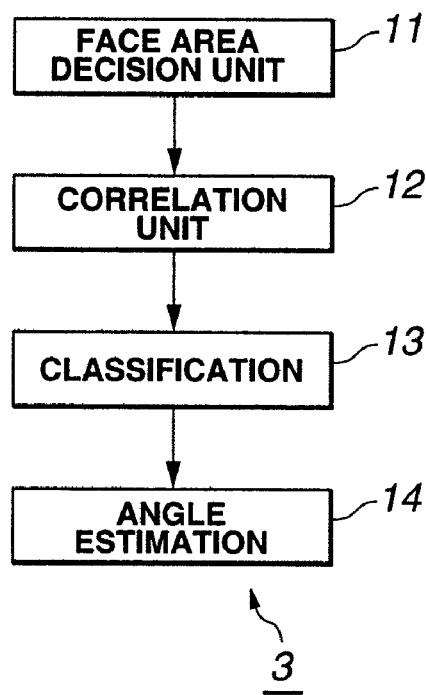
FIG. 2 is a block diagram showing a functional structure of a processing device in the image processing apparatus.

The processing device 3 has functional blocks shown in FIG. 2. A face area decision unit 11 verifies, from image data fed from the image processing apparatus 1, where lies the face area as a range to be compared to the template. A correlation processing unit 12 calculates the correlation between the face area verified by the face area decision unit 11 and the template previously stored in the memory device 4. A classification unit 13 performs classification based on the correlation calculated by the correlation processing unit 12, whilst an angle prediction unit 12 performs the processing of estimating the angle of the face orientation of the object inputted from the image processing apparatus 1 in association with the classification achieved by the classification unit 13.

Figure 3:
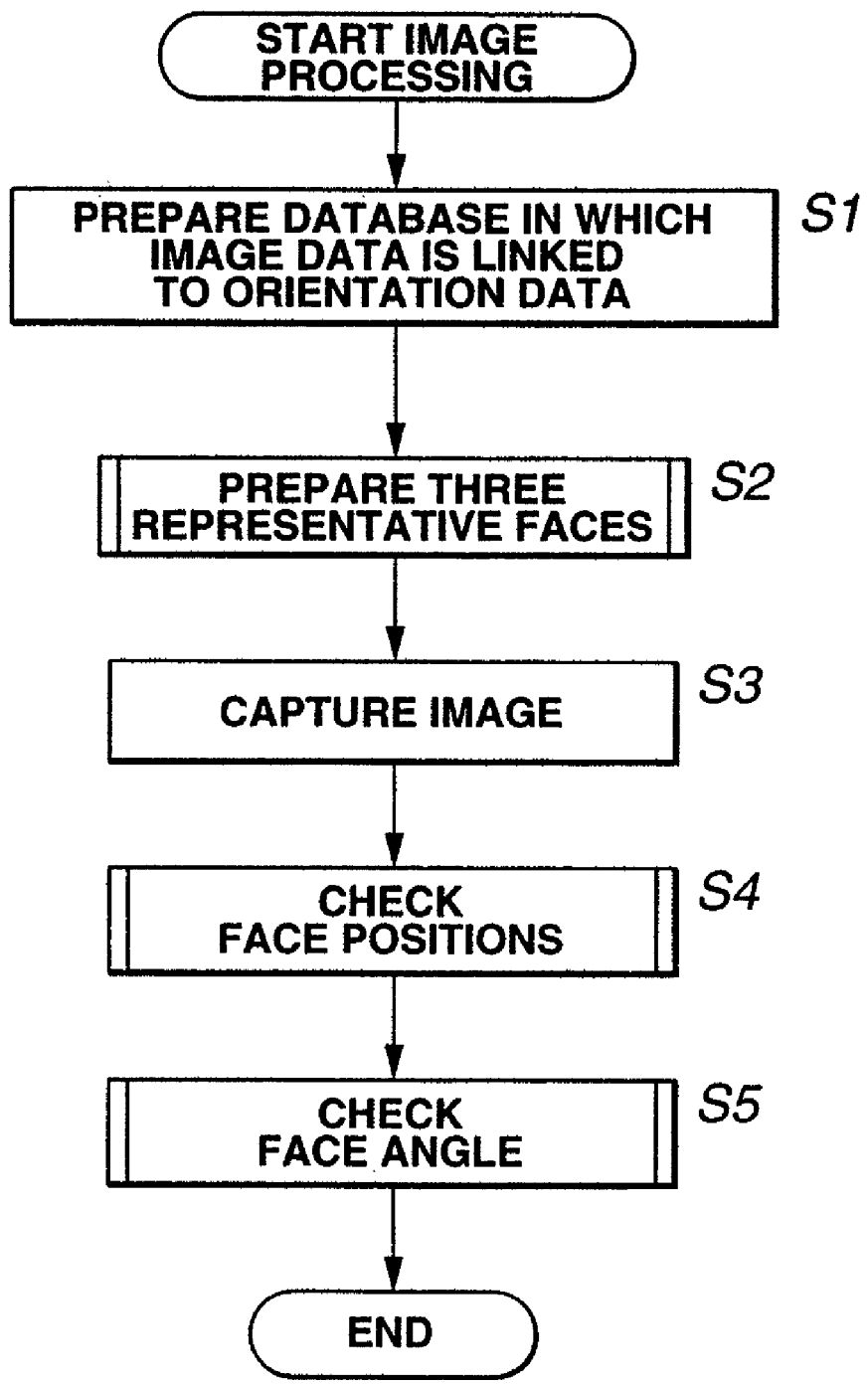
FIG. 3 is a flowchart for illustrating the operation of the image processing apparatus.
Figure 4:
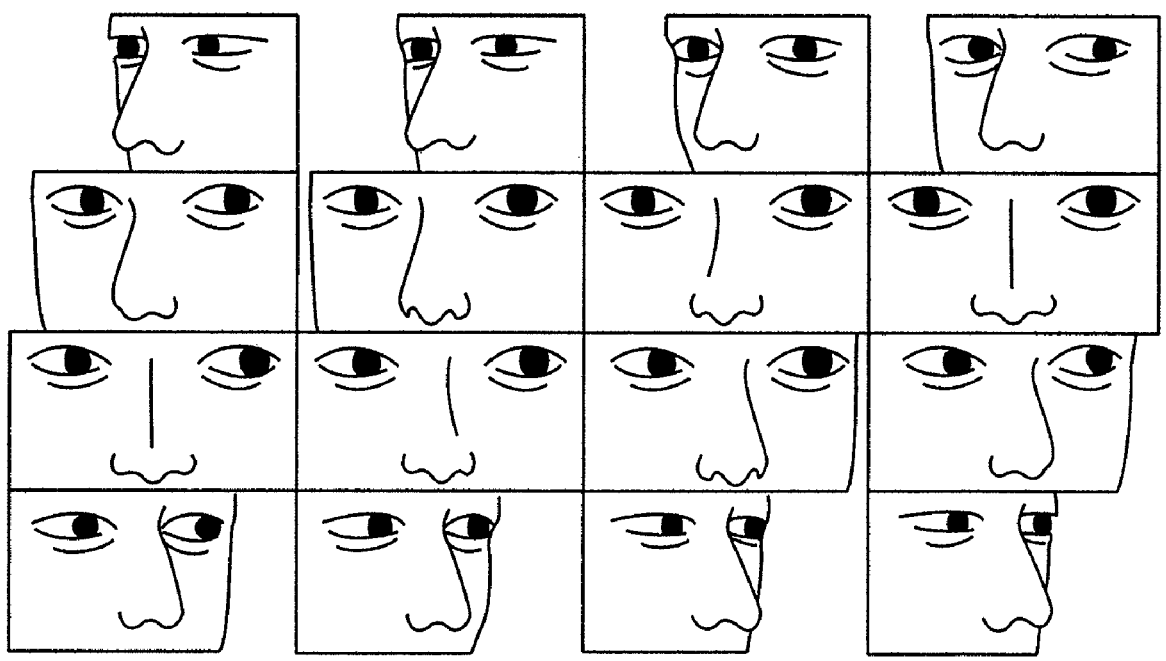
FIG. 4 shows an example of a database.

Referring to the flowchart of FIG. 3, the operation of the above-described image processing apparatus is explained. First, at step S1, the processing of preparing a database in which the image data is linked to orientation data is executed. That is, at step S1, the face of a human being, as an object, oriented in a pre-set direction, is imaged. The image data, obtained from the image processing apparatus 1, is A/D converted by the A/D converter 2 and sent to the processing device 3. From the input image data, the processing device 3 extracts a range of a frame manually specified by the user, here a range of a rectangle including both eyes and a nose, and sends the extracted range to the memory device 4 for storing. At this time, the processing device 3 stores the angle of orientation of the face as orientation data in a linked relation to the image data. Similar processing is carried out plural times for a sole face as the face is oriented in plural different directions. This processing is carried out for plural persons so that respective image data linked with the orientation data are stored in the memory device 4. So, image data made up of a pre-set number of templates shown for example in FIG. 4 are stored in the memory device 4. Although only 16 templates are shown in FIG. 4 for simplicity, 130 templates, for example, are registered.

Figure 5:
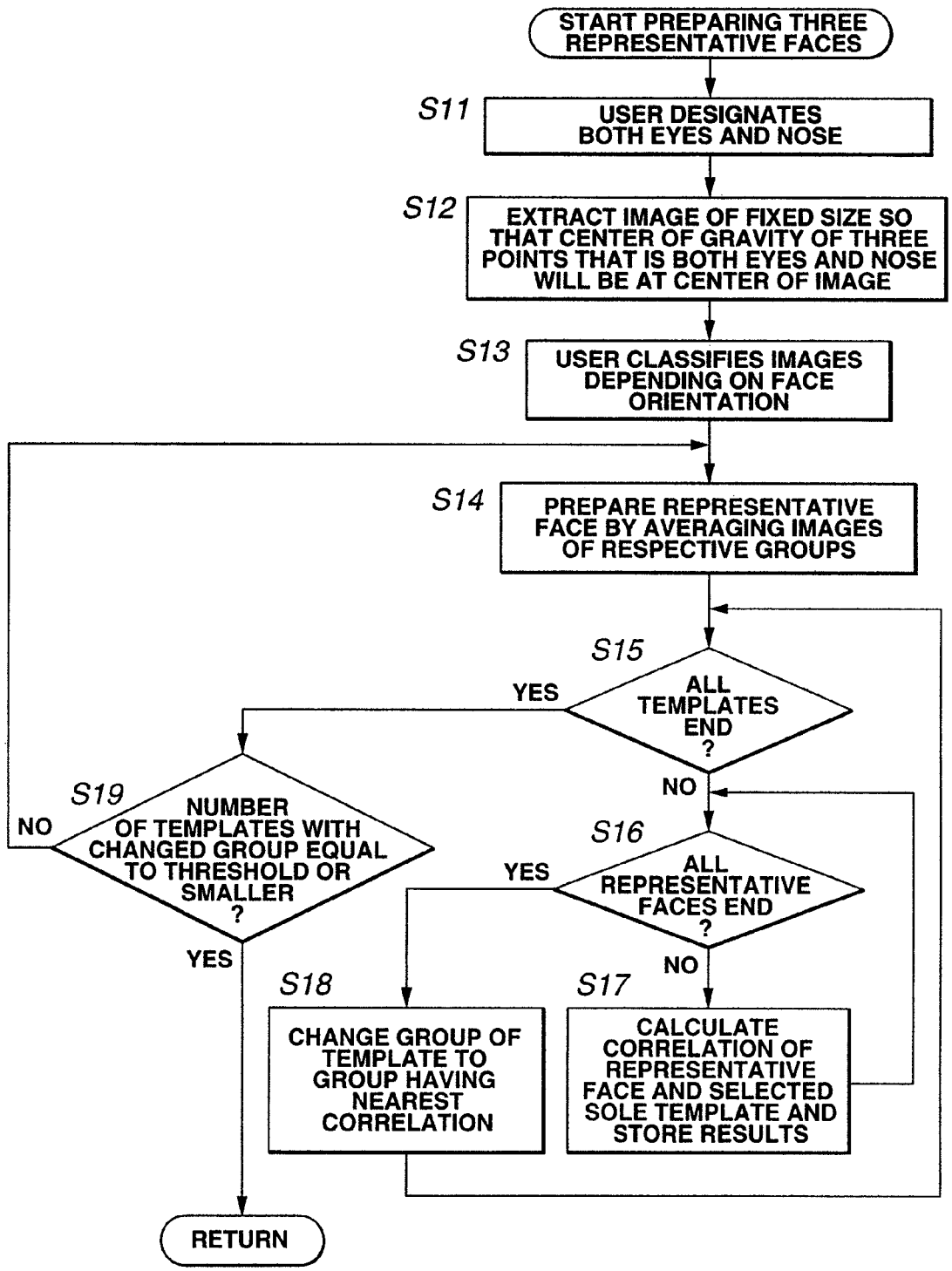
FIG. 5 is a flowchart showing the processing for preparing images of three representative faces in the image processing apparatus.

Then, at step S2, the processing of preparing images of three representative faces is executed at step S2. This processing is shown in detail in FIG. 5.

At step S11, the user specifies the positions of both eyes and the noses of 130 templates prepared at step S1. At step S12, the processing device 3 extracts an image of a pre-set size from each template so that the center of gravity of an area specified by the three points of both eyes and the nose, designated at step S11, will be at the center of the image. At step S13, the user classifies the images, extracted at step S12 from the respective templates, into three face classes, by a manual operation, depending on the face orientation. For example, an image looking on the front side, an image on the right side of the face and an image on the left side of the face are classified into a first face class, a second face class and a third face class, respectively.

Then, at step S14, the processing device 3 prepares an image of a representative face by calculating a mean value of the images in the three face classes. Since the effective area differs with face orientation, as shown in FIG. 4, the templates classified into respective face classes are not necessarily the same. So, the image averaging processing is carried out by registering the eye positions under the templates of the different shapes.

If there are templates with respective different effective areas, as shown in FIGS. 6A to 6C, the averaging is carried out within a range of the smallest area A. From the image data $D_A$ of the smallest area A, the image data $D_B$ of the area B and from the image data $D_C$ of the area C, an average value $R_{AVG}$, shown by $$R_{AVG}=(D_A+D_B+D_C)/3$$

is calculated as image data of the representative face of the representative faces.

Alternatively, referring to FIG. 8, an average value $R_{AVG}$ is calculated from the three templates (areas A, B and C), within a range of the smallest area A, by an equation:

$$R_{AVG1}=(D_A+D_B+D_C)/3$$

to obtain image data of the representative face. Within a range B outside the range A, an average value $R_{AVG2}$ is calculated from the two templates (areas B and C) by an equation:

$$R_{AVG2}=(D_B+D_C)/2$$

to obtain image data of the representative face. In a range C outside the range B, the image data $D_C$ is the image data of the representative face. In this case, the number of the areas for averaging is changed from area to area.

If an average value is taken of the areas A, B and C, calculations are not made on the assumption that the pixels outside the area A and those outside the area B are not assumed to be 0, but it is assumed that there exists a pre-set value K. Thus, as shown in FIG. 9, an average value $R_{AVG2}$, shown by the equation:

$$R_{AVG2}=(K+D_B+D_C)/3$$

is calculated within the area B outside the area A to give image data of the representative face, whereas, within the area C outside the area B, an average value $R_{AVG3}$, shown by the equation:

$$R_{AVG3}=(2K+D_C)/3$$

is calculated to give image data of the representative face.

In finding an average value of the respective areas A to C, it is also possible to calculate an average value $R_{AVG4}$, shown by the equation:

$$R_{AVG4}=(K+D_B+D_C)/n$$

where a parameter n is the number of the face classes, to give image data of the representative face.

The program then moves to step S15 where it is verified whether or not the processing on the 130 templates in their entirety has come to a close. If the processing has not come to a close, the program moves to step S16 where it is verified whether or not the calculations of the correlative value C for the images of the entire representative faces have come to a close. If the calculations of the correlative value C with the images of the three representative faces have not come to a close, the program moves to step S17 where the processing device 3 calculates the correlative value C with the image of the representative face for which the correlative value C has not been found, and stores the calculated correlative value C. The program then reverts to step S16 to repeat the processing until the processing of step S17 has verified that the correlative values C with the images of the three representative faces with the sole template are verified to have been found at step S16.

The correlative value C is calculated in accordance with, for example, the following equation (1):

$$C = \frac{\sum_i (R_i - R_{AVG})(T_i - T_{AVG})}{\sqrt{\sum_i (R_i - R_{AVG})^2 \sum_i (T_i - T_{AVG})^2}} \quad (1)$$

where R denotes the image data of the representative face and $R_{AVG}$ its average value, T denotes image data of a template and $T_{AVG}$ denotes its average value.

If calculations of the correlative value C between a sole template and the images of the three representative faces come to a close, the program moves to step S18 where the processing device 3 classifies the template to the face class, to which belongs the image of the representative face having the highest correlation among the correlative values C with the images of the three representative faces.

The program then reverts to step S15 where it is checked whether or not the same processing has been performed on the 130 templates in their entirety. When the similar processing comes to a close for the 130 templates in their entirety, the program moves to step S19 where the processing device 3 checks whether or not the number of templates among the 130 templates in which the belonging face classes have been changed to past face classes has become smaller than a pre-set threshold value. If the result of decision at this step S19 is NO, the program reverts to step S14, where a pixel-based average value of an image of the template belonging to the class is calculated for each face class to prepare (update) an image of the representative face. For the newly prepared images of the three representative faces, the processing of steps S15 to S18 is executed to calculate the correlative values between the 130 templates and the new images of the three representative faces. Each template has its face class changed so that the face class is now the image of the representative face, among the images of the representative faces, which has closer correlative values.

The program moves to step S19 where it is checked whether or not the number of the templates, the face classes of which have been changed, is smaller than a pre-set threshold value. If the number of the templates, the face classes of which have been changed, is verified to be not smaller than the threshold value, the program reverts to step S14 to execute the subsequent processing repeatedly. If the number of the templates is verified to be equal to or smaller than the threshold value, the processing comes to a close. At this step, convergence check may also be carried out, using the rate of change of the number of the templates, the face classes of which have been changed, or the number of times of the re-classification processing operations, as q threshold value.

Figure 10:
FIG. 10 illustrates images of three representative faces.

An average face of the three face classes, shown for example in FIG. 10, is registered as the image of the representative face of each face class, in the manner as described above.

Figure 11:
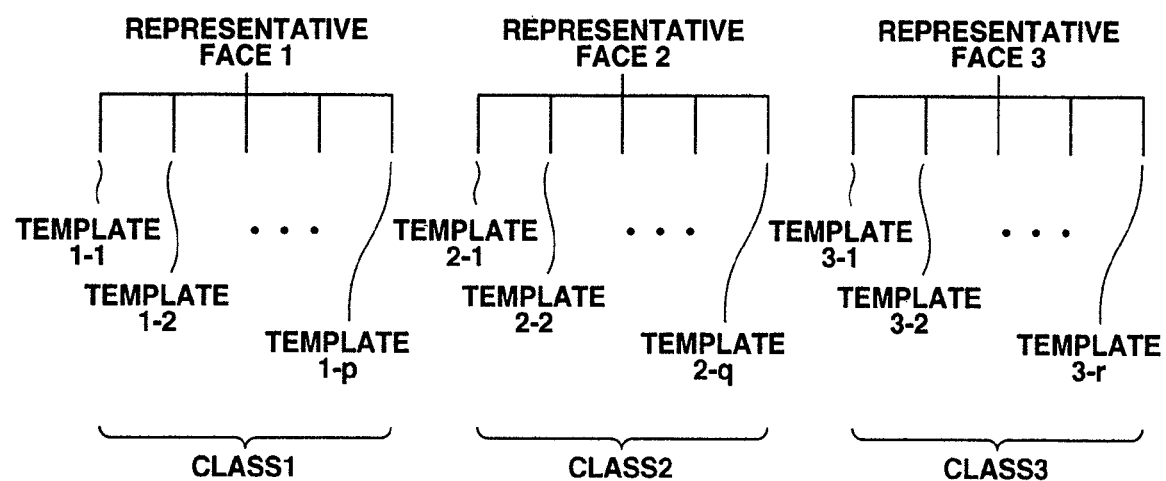
FIG. 11 shows the relation between the image of the representative faces and associated templates.

FIG. 11 schematically shows the relation of the representative faces of the three face classes and the templates belonging to the face classes. In this figure, the representative face 1 of the class 1 is an average face of the templates 1-1 to 1-*p*, the representative face 2 of the class 2 is an average face of the templates 2-1 to 2-*q*, and the representative face 3 of the class 3 is an average face of the templates 3-1 to 3-*r*. In the present example, the value of p+q+r is 130.

In the present example, the pixel-based average value of the image of the template belonging to a face class is calculated from one face class to another to prepare an image of the representative face of each face class. Besides the above-mentioned average value, the image of the representative face of each face class may also be prepared using a pixel value having a median value of the entire pixels, a median value between the maximum and minimum values or the pixel value having an intermediate value, in place of the above-mentioned average value.

Figure 12:
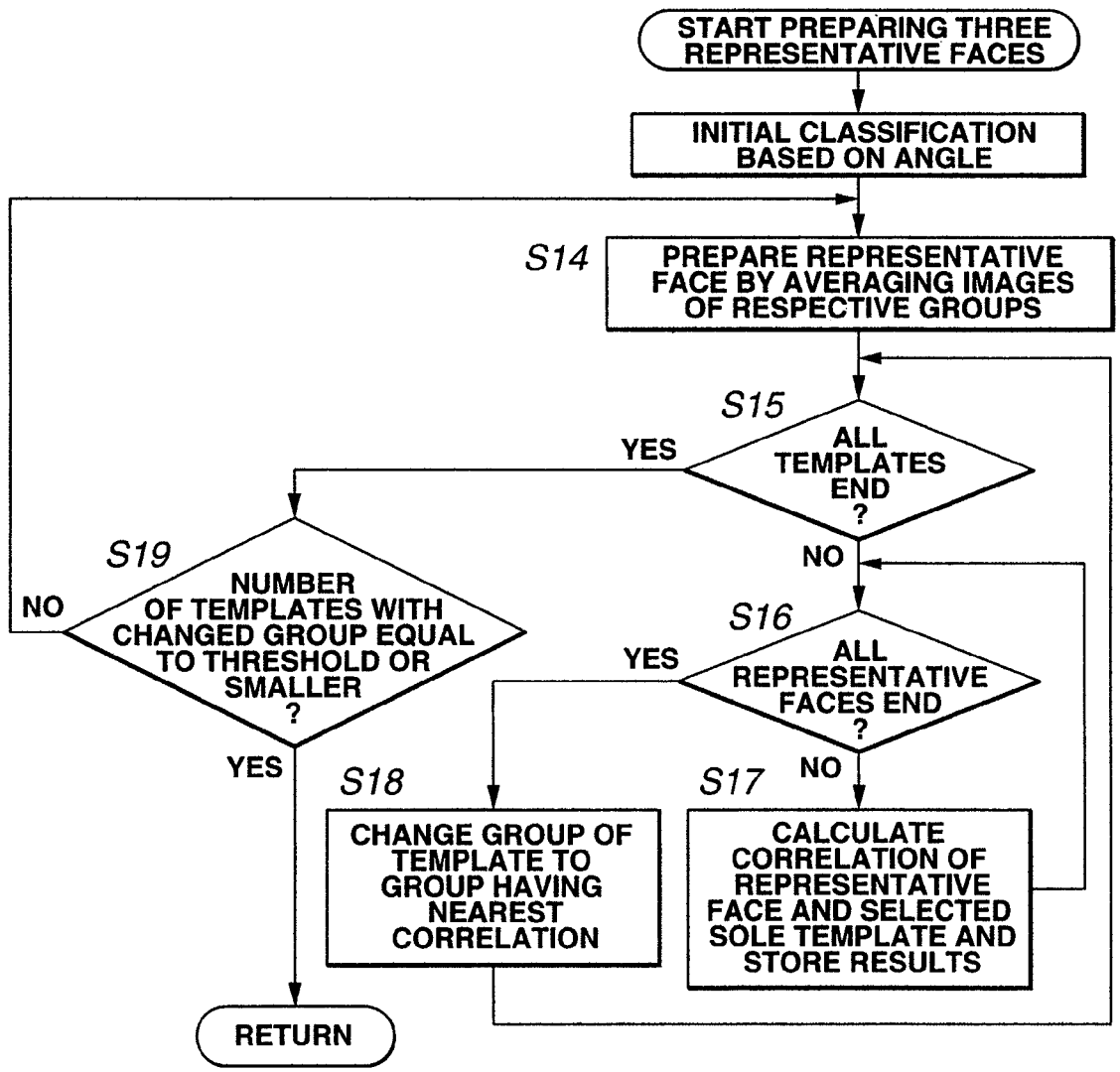
FIG. 12 is a flowchart showing another example of the processing for preparing images of the representative faces.
Figure 13:
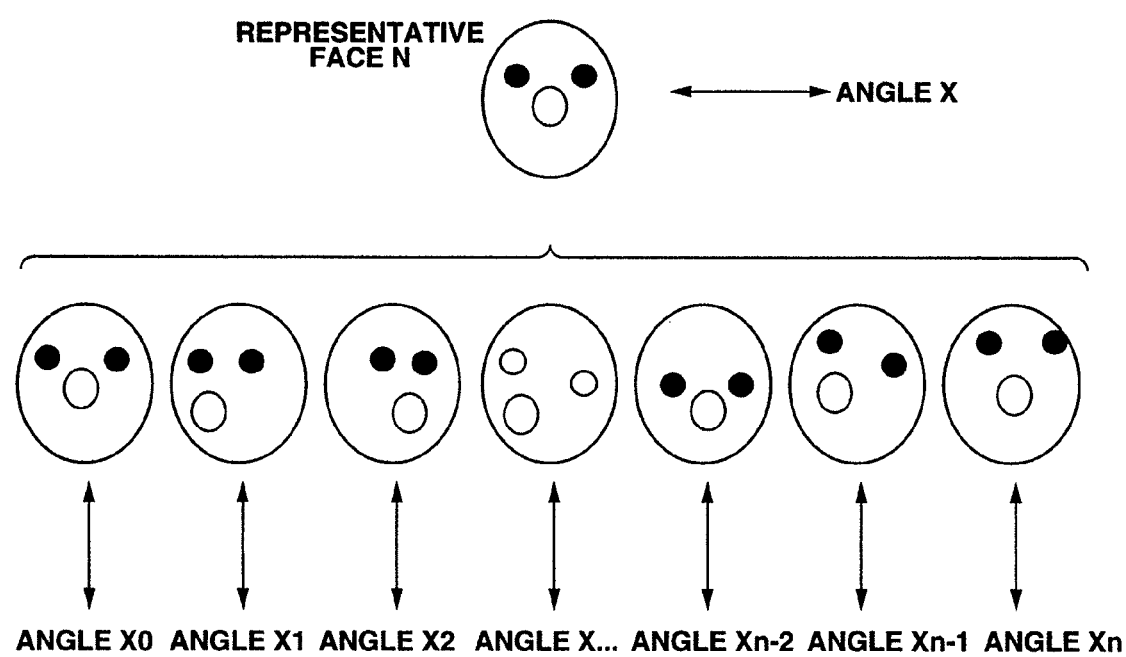
FIG. 13 shows the relation between the images of the three representative faces and the associated templates in the initial classification processing.

It is noted that, if, in the processing of preparing the images of the three representative faces from the 130 templates prepared at step S1, the information on the angle of orientation of respective faces are previously imparted to the 130 templates, it is possible to perform the processing of initially classifying the images of the respective templates to the above-mentioned first to third face classes, at step S10, based on the above-mentioned angular information, in place of the processing at steps S11 to S13, as shown in FIG. 12. That is, the images of the respective templates are classified into face classes of the representative faces N, based on the angular information X0 to Xn, as shown in FIG. 13.

Figure 14:
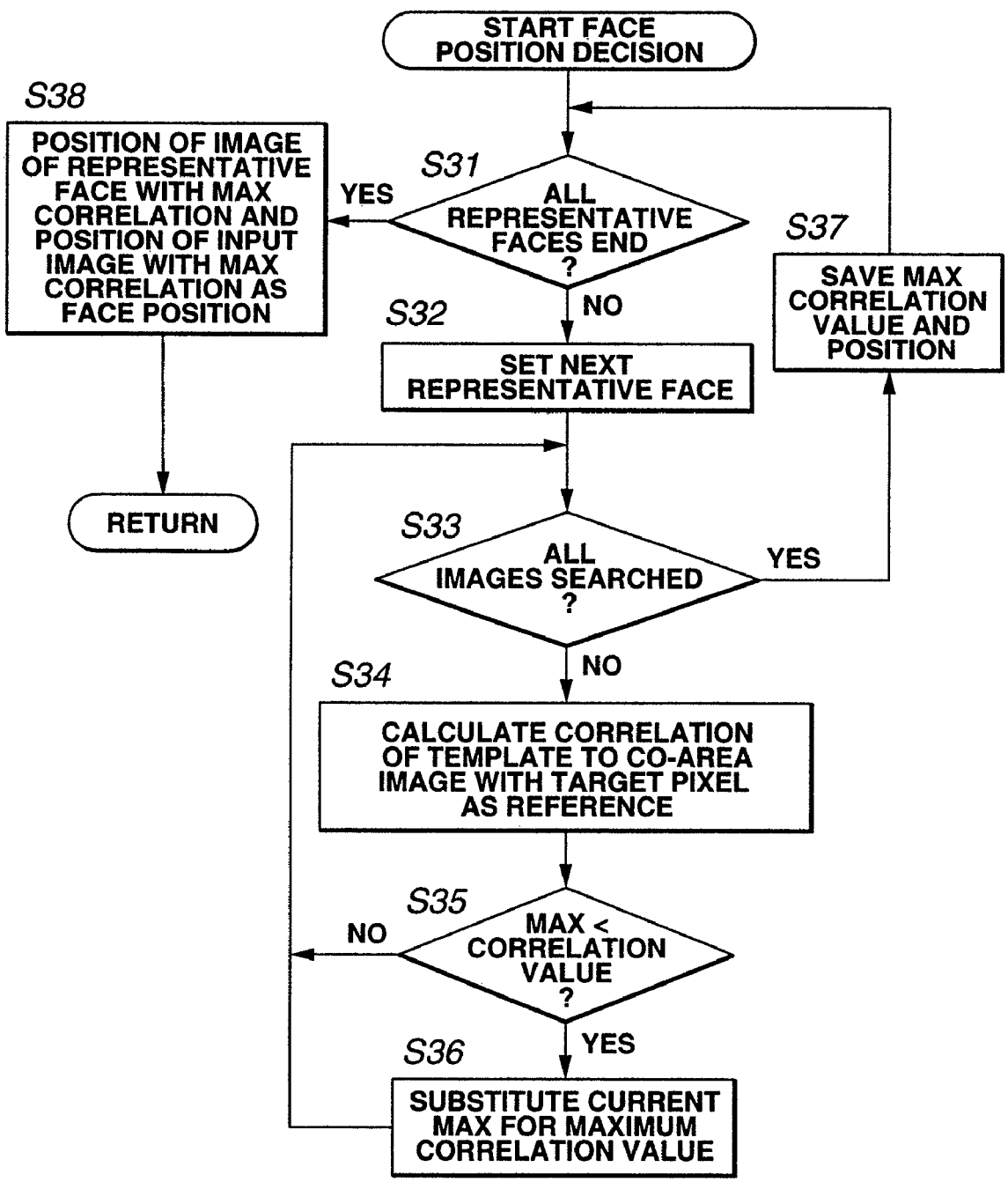
FIG. 14 is a flowchart showing the face position decision processing by the image processing apparatus.

After the images of a number, herein three, of the representative faces, smaller than the number of the templates in the database, herein 130, have been prepared as described above, the processing of detecting the orientation of the faces to the really inputted image is executed. That is, at step S3 of FIG. 3, the face of the object is imaged at step S3 of FIG. 3, by the image processing apparatus 1. The processing device 3 executes face position decision processing and face angle decision processing, at steps S4 and S5, respectively. The face position decision processing of step S4 is shown in detail in the flowchart of FIG. 14.

First, at step S31, the face area decision unit 11 of the processing device 3 verifies whether or not the processing for the images of the three representative faces in their entirety has come to a close. If the processing has not come to a close, the program moves to step S32 to set an image of a representative face to be processed next. At step S33, the face area decision unit 11 checks whether or not the searching of the entire area of the image of the representative face set at step S32 has come to a close. If this searching has not come to a close, the program moves to step S34 where the face area decision unit 11 calculates the correlative value between the image of an area of the same size as that of the template, referenced to a pixel under consideration in a frame of an input image and the image of the targeted representative face.

If, for example, a center image of the three representative faces shown in FIG. 10 is selected as a representative face being processed, the areas of the same size as this representative face are sequentially extracted, beginning from the upper left area of the frame of the input image, to calculate the correlation between the image of the area and the image of the representative face.

The program then moves to step S35 where it is checked whether or not the correlative value as found by the calculations at step S34 is larger than the maximum value MAX of the correlative value held at the time point. If the result of decision at this step S35 is YES, the program moves to step S36 to store the correlative value as found by the calculations at step S34 as the maximum value MAX at the time point.

The program then reverts to step S33 where it is checked whether or not the search has been performed over the entire area. If the search is not performed over the entire area, the program moves to step S34 where the face area decision unit 11 moves the position of the area corresponding to the representative face pixel-by-pixel within the frame of the input image as from the previous time position. The correlative value between the image of the area of the new position and the image of the representative face is again calculated. At step S35, it is checked whether or not the correlative value as found at step S34 is larger than the maximum value MAX stored in the past at step S36. If the result of decision at this step S35 is YES, that is if the correlative value as found at step S34 is larger than the maximum value M stored in the past at step S36, the maximum value MAX is updated at step S36 with the correlative value as found at step S34. If it is found at step S35 that the maximum value MAX is smaller than the correlative value as found at step S34, the processing at step S36 is skipped.

The above-described processing is repeatedly carried out by sequentially moving (searching) the area in the frame of the input image to be compared to the representative face from upper left to lower left. This processing is repeatedly carried out until it is verified at step S33 that searching has been carried out over the entire area of the input image.

If, at step S33, it is verified that searching has come to a close over the entire area of the frame of the input image, the program moves to step S37 where the correlation processing unit 12 stores the position for which the maximum correlative value in a frame of an input image has been obtained and the maximum correlative value, that is the maximum value MAX obtained by the processing of step S36.

Figure 17:
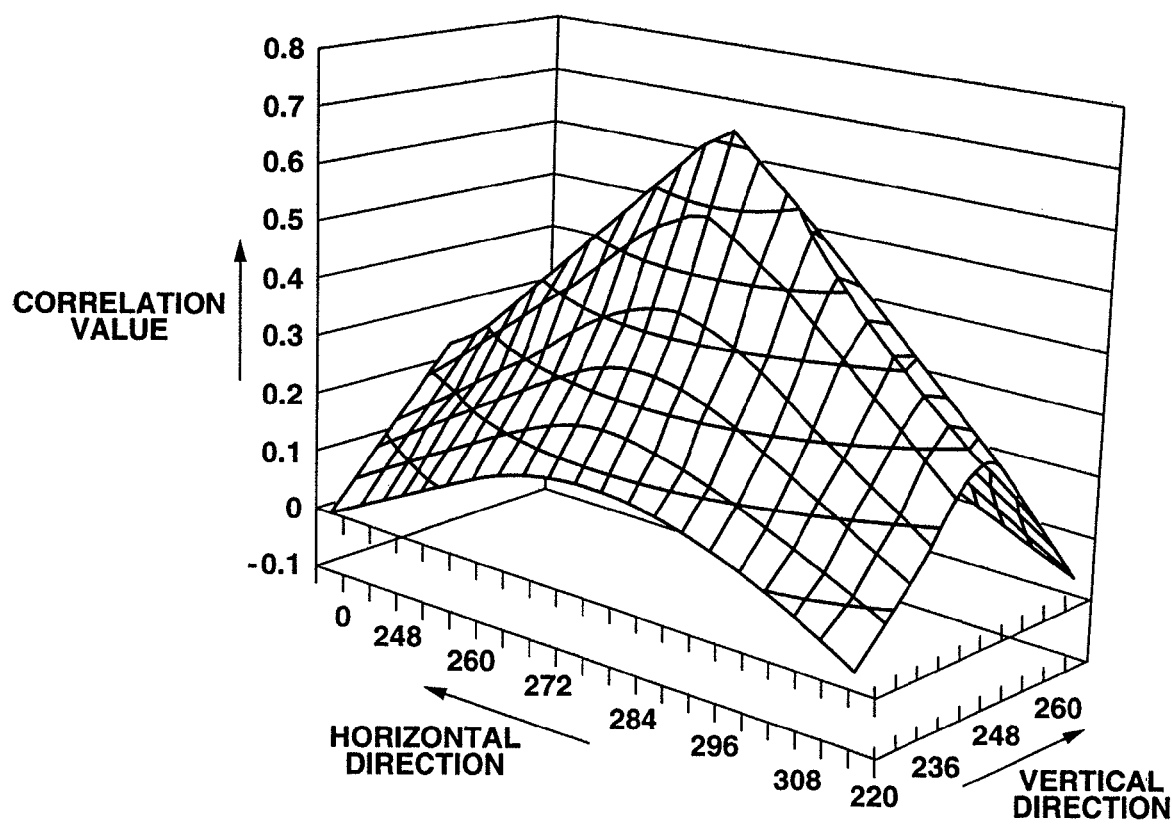
FIG. 17 schematically shows the correlative values in three-dimensional representation wherein the high correlative value portions are shown to an enlarged scale.

FIG. 16 shows an example of the position for which the maximum correlative value has been obtained. That is, a rectangular frame in FIG. 16 represents the range of an area corresponding to the representative face, with its upper left corner being a position of the representative face. FIG. 16 shows the correlative values, obtained as a result of searching, in terms of concentration, with the higher and lower correlative values being indicated so as to be whiter and blacker, respectively. In the example of FIG. 16, the vicinity of the upper left portion of the displayed frame is shown in white, with the other areas being shown in black. Therefore, in the example of FIG. 16, the position for which an image having the highest correlation to the representative face shown on the upper left of the screen is the position shown by the frame. Meanwhile, FIG. 17 shows the high correlative value area to an enlarged scale to indicate the correlative values three-dimensionally.

The program then reverts to step S31 to check whether or not the processing of the images of the three representative faces has come to a close. In the present example, since the processing on only one image of the representative face has come to a close, the right-side image, among the images of the three representative faces shown in FIG. 10, is selected as being a representative face to be processed in the processing at step S33 ff.

As a result, the maximum correlative value between the input image shown in FIG. 15B and the image of the representative face shown on the right side of FIG. 10, and the position for which the maximum correlative value has been obtained, are found, with the corresponding value being stored at step S37.

The program then reverts to step S31 where the image of the representative face shown on the left of FIG. 10 is selected as a targeted representative face, and the position for which the maximum correlative value between the image and the input image shown in FIG. 15B, as well as the correlative value, is obtained, is retrieved and saved at step S37.

If the processing for the images of the three representative faces has come to a close, as described above, the check of step S31 is carried out, after which the program moves to step S38 where the correlation processing unit 12 stores the position of the image having the maximum correlative value with the input image, among the images of the three representative faces, as the face position of the input image.

In the present example, the input image is an image of a face looking forwards, as shown in FIG. 15B, so that the correlation with the center image, among the images of the three representative faces shown in FIG. 10 is maximum. So, the position shown by the white frame is stored as the maximum position of the correlation of this input image.

Figure 18:
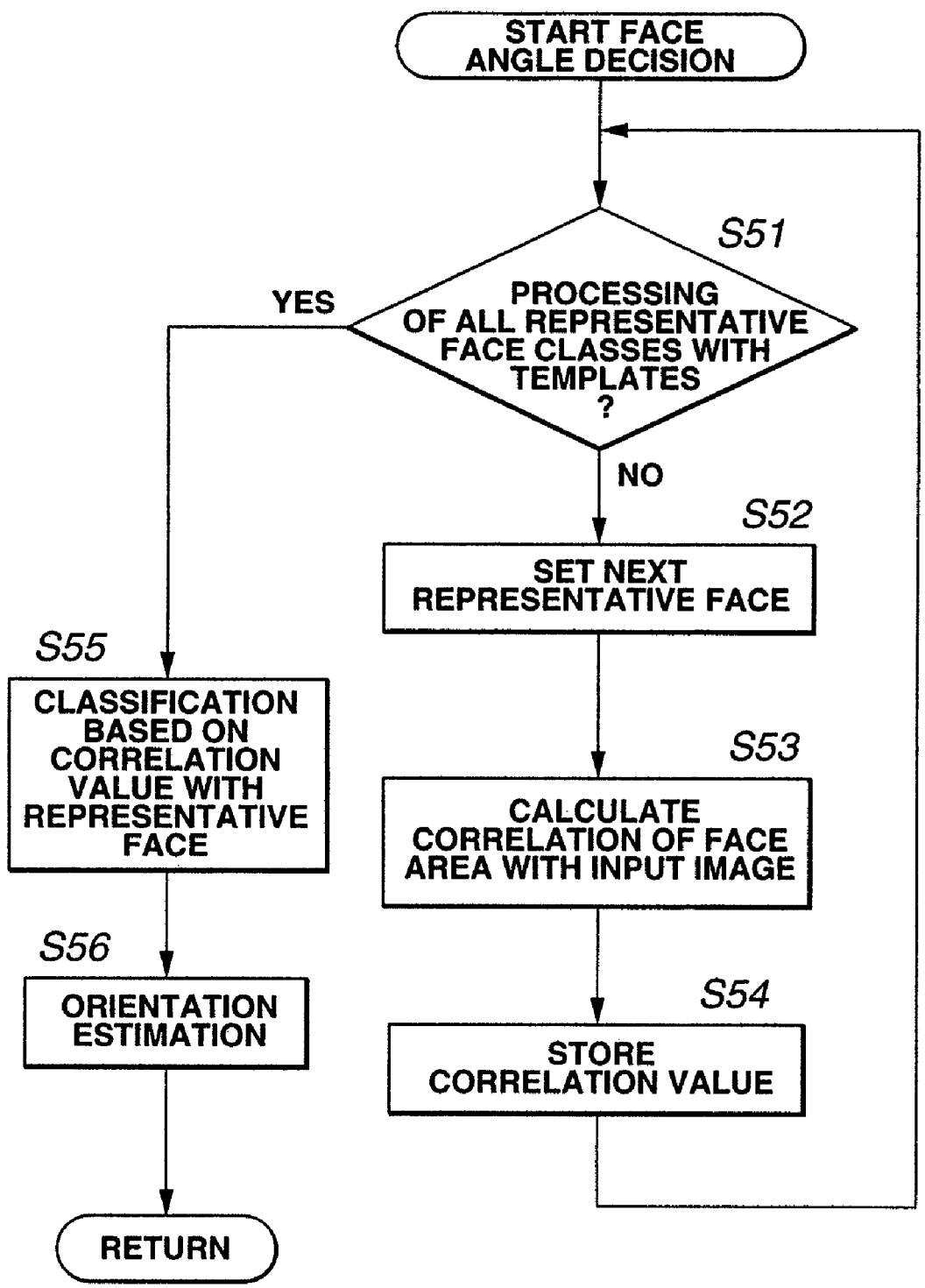
FIG. 18 is a flowchart showing the face angle decision processing in the image processing apparatus.

When the face position of the input image (position of a range to be compared to the images of the three representative faces) is specified as described above, the face angle decision processing of step S5 of FIG. 3 is carried out. The face angle decision processing is shown in detail in the flowchart of FIG. 18.

First, at step S51, the correlation processing unit 12 verifies whether or not the processing for calculating the correlative values between the images of the three representative faces and the area of the input image shown in a frame in FIG. 15B has come to a close.

If the processing has not come to a close, the program moves to step S52 to set an image of the representative face to be processed next. At step S53, the correlation processing unit 12 performs the processing of calculating the correlation between the image of the area represented by the frame in FIG. 15B and the image of the representative face set at step S53, for example, the image of the representative face shown centrally in FIG. 10. The so-calculated correlative value is stored at step S54. Meanwhile, since this correlative value is the same as the value stored for the image of the representative face at step S37 of FIG. 14, the processing of steps S53 and S54 in the image of the representative face can be omitted, if so desired.

The program then reverts to step S51 to execute at step S53 the calculations of finding out the correlative value between the image of the representative face shown on the right side of FIG. 10 and the area shown in the frame of FIG. 15B. The so-calculated correlative value C is stored at step S54. Although the calculations of the correlative value between the image of the representative face and the input image shown in FIG. 15B are already executed at steps S33 to S36 in FIG. 14, the value stored at step S37 is not necessarily the result of comparison with respect to the area shown in the frame of FIG. 15B (the area which gives the maximum correlation with respect to the image of the representative face shown centrally in FIG. 10), the correlative value is actually carried out and newly stored insofar as the image of this representative face is concerned.

In similar manner, the processing of steps S53 and S54 is executed for the representative face shown on the left side of FIG. 10 so that the correlative value with respect to the area shown framed in FIG. 15B is calculated and stored.

When the correlative value between the pre-set area of the input image and the images of the three representative faces is found as described above, the classification unit 13 executes classification processing based on the correlative value with respect to the images of the representative faces.

When the classification unit 13 has determined the class based on the correlative value, it outputs the class to an angle estimation unit 14. It is noted that the class is uniquely determined, given the correlative values C1, C2 and C3, for example. Specifically, the class means such a class used in a technique of classifying input data based on similarity of properties and of applying data processing as found by learning at the outset from one relevant class to another.

The angle estimation unit 14 at step S56 calculates the angle è of the input image in accordance with the following equation:

$$è = w1C1 + w2C2 + w3C3 \quad (2)$$

wherein C1 to C3 represent the correlative value of the input image to the images of the three representative faces stored at step S54 and w1 to w3 are coefficients. The angle estimation unit 14 memorizes these coefficients w1 to w3 from one class determined based on the correlative value to another. Specifically, the angle estimation unit 14 at step S56 reads out coefficient sets corresponding to the classes inputted from the classification unit 13 and multiplies the coefficient sets with the correlative values C1 to C3, inputted from the correlation processing unit 12 through the classification unit 13, to calculate the angle è in accordance with the equation (2).

FIG. 19 shows the relation between the correlative value and the angle of orientation of the object. In FIG. 19, the ordinate and the abscissa denote the correlative value and the actual angle of orientation of the object. Moreover, in FIG. 19, leftward, front or rightward denote that the correlative values with respect to the input image are obtained using the images of the representative faces shown on the left, center or on the right of FIG. 10. As may be seen from FIG. 19, if the correlative value with respect to the input image of the object is found using the image of the representative faces facing to the front side, the highest correlative value is obtained when the object faces to the front side, with the correlative value becoming smaller the more the object faces rightwards or leftwards.

It may be seen that, if the image of the representative face facing to the left is used, there is obtained a correlative value approximately proportionate to the angle of object orientation when the object is facing to the left from the front side. It may similarly be seen that, if the image of the representative face facing to the right is used, there is obtained a correlative value approximately proportionate to the angle of object orientation when the object is facing to the right from the front side.

Figure 20:
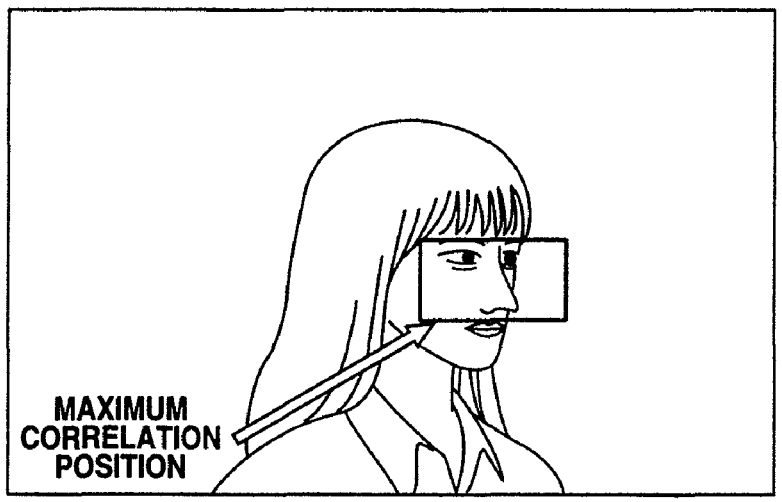
FIG. 20 illustrates an input image and the image of the representative face having the maximum correlation with the input image.
Figure 21:
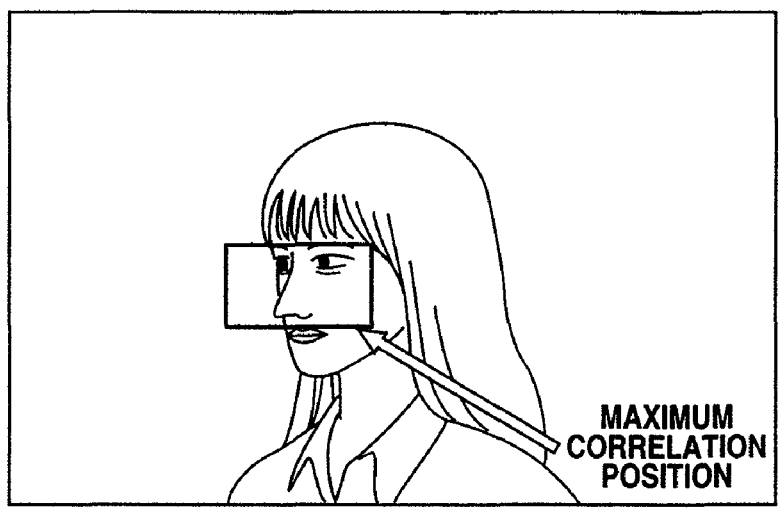
FIG. 21 illustrates an input image and the image of the representative face having the maximum correlation with the input image.

Thus, if the input image is an image corresponding to the right side face of the object, as shown in FIG. 20, the maximum correlative value is obtained when the input image is the image of the representative face shown on the right side of the images of the three representative faces shown in FIG. 10. Similarly, if the input image is an image corresponding to the left side face of the object, as shown in FIG. 21, the maximum correlative value is obtained when the input image is the left side image of the images of the three representative faces shown in FIG. 10.

Meanwhile, in the learning of the class-based coefficient set, algorithms used in e.g., vector quantization, such as a k-means method, can be used to generate images of a smaller number of classes, from a large number of input images, to learn the coefficient set which will give correct results. Meanwhile, the k-means method, also termed an LBG algorithm, is disclosed in detail e.g., in "Image Information Compression", published by OHM Co. Ltd., pages 127 to 130.

Figure 22:
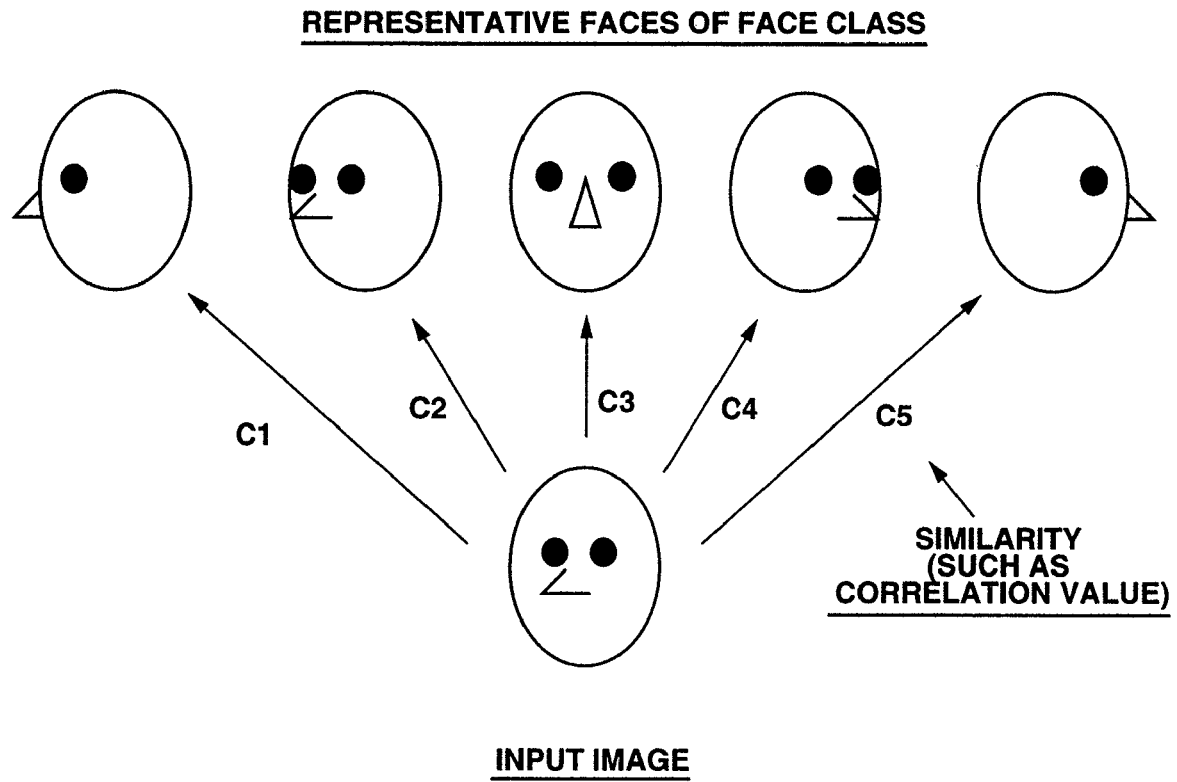
FIG. 22 illustrates the relation between the input image and the face class.

The above-described principle of the present invention is shown schematically in FIG. 22, from which it may be, seen that, according to the present invention, a smaller number of, herein five, images of the representative faces are prepared from a large number of templates. The orientation of the input image is calculated by class classification adaptive processing for the correlative value C of an input image and an image of the representative face.

Figure 23:
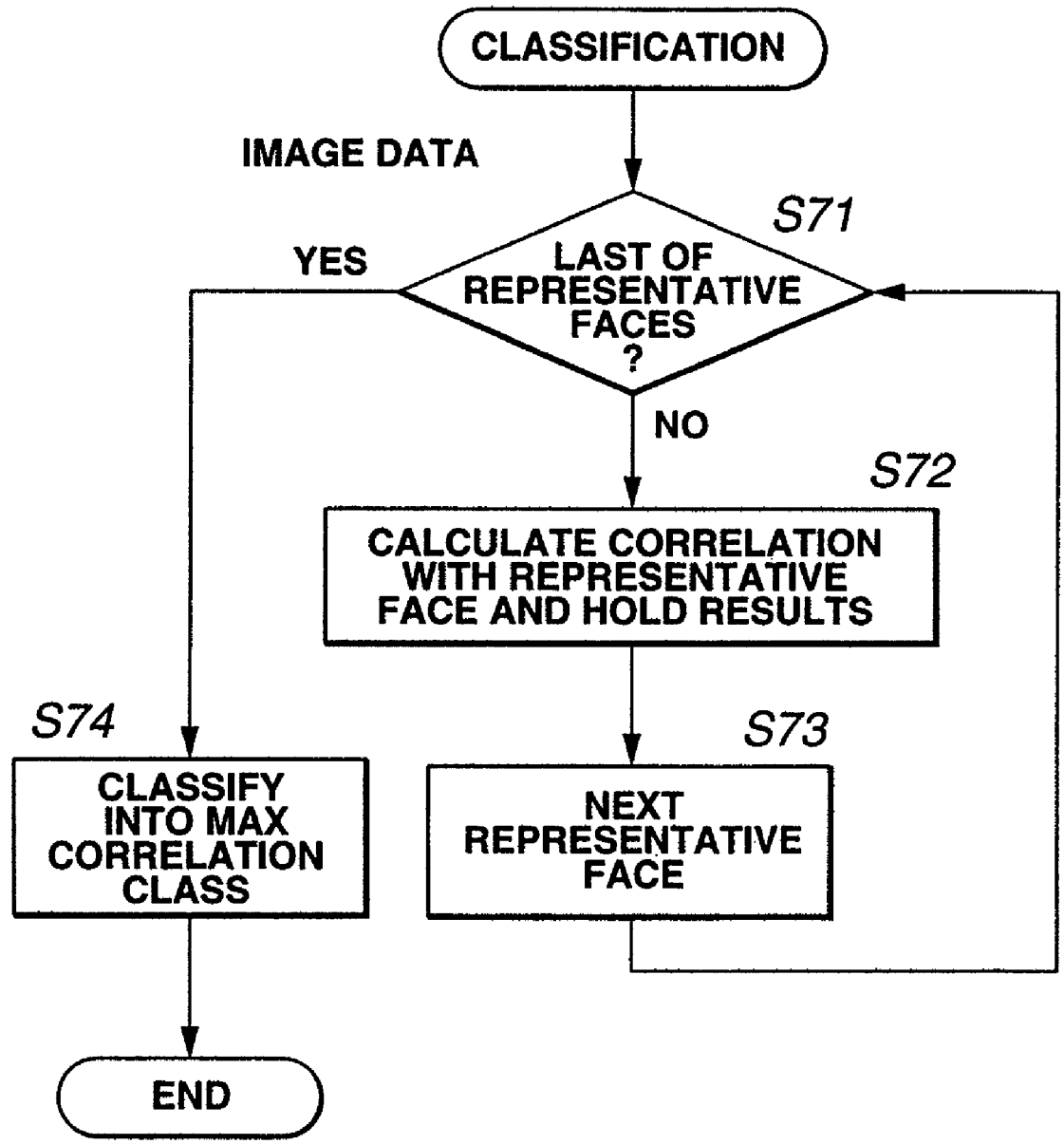
FIG. 23 is a flowchart showing the class decision processing for classification into classes.

It is noted that the class classification processing is carried out by evaluating the correlative value between the image of the representative face and the input image in accordance with the sequence of operations shown in the flowchart of FIG. 23.

That is, in the class classification processing, shown in the flowchart of FIG. 23, it is first verified at step S71 whether or not the correlative value has been evaluated of the input image with the images of the representative faces in their entirety. If there is any image of the representative face, not evaluated, the program moves to step S72 to calculate the correlation between the image of the representative face and the input image to save the correlative value C. At step S73, the image of the next representative face is specified. The program then reverts to step S71 to repeat the processing as from step S71 up to step S73. If the evaluation has been made of the correlative values C1 to C3 with the images of the representative faces in their entirety, the program moves to step S74 to classify the image data in the image class of the representative face having the highest correlation.

Figure 24:
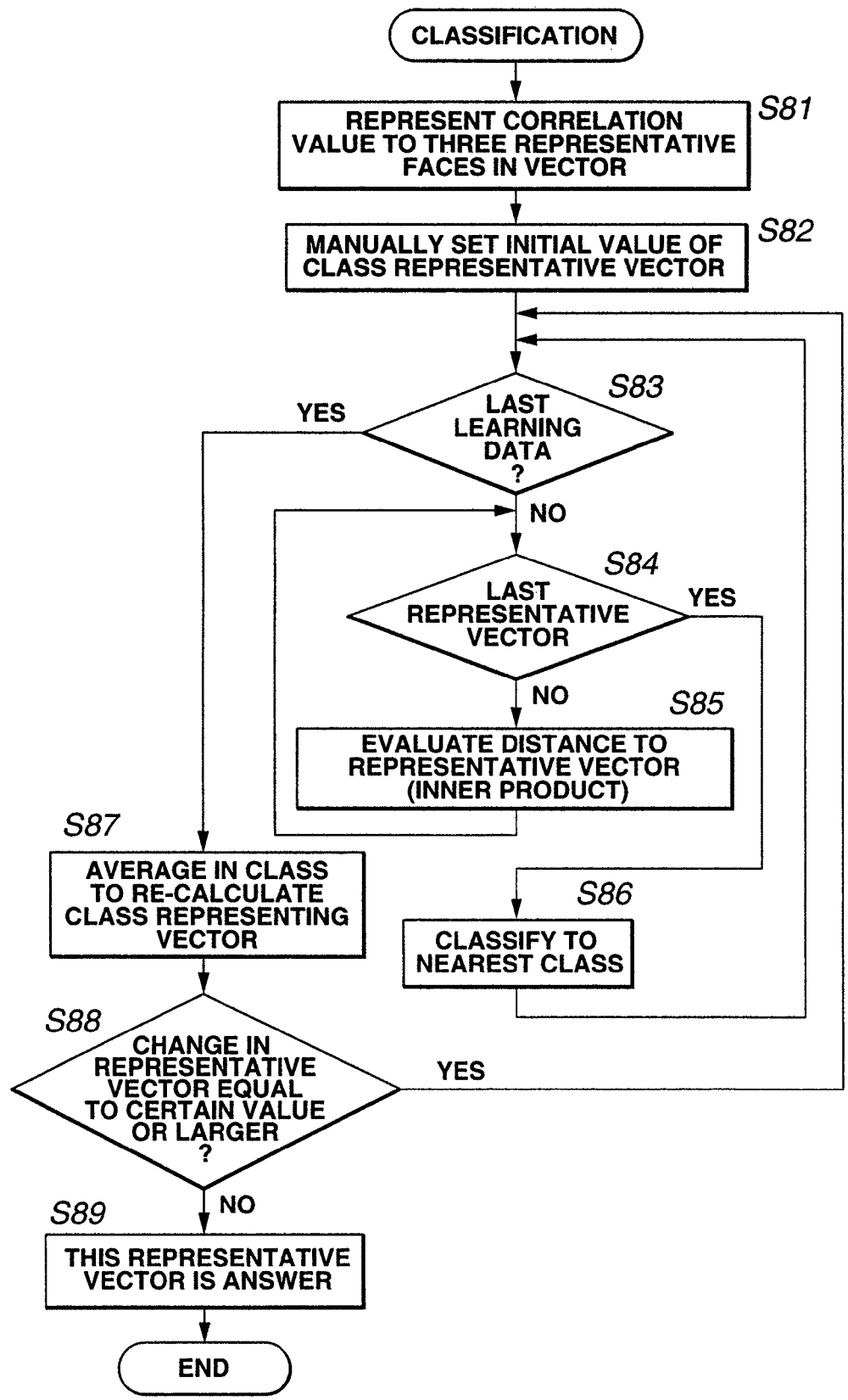
FIG. 24 is a flowchart showing another example of the class decision processing for classification into classes.

If there are many sets (vectors) of the correlative values between the input images with a known angle è and images of the representative faces, the class classification processing may be executed in accordance with the operational sequence shown in the flowchart of FIG. 24.

That is, in the class classification processing, shown in the flowchart of FIG. 24, the correlative values c1, c2 and c3 for the images of the respective representative faces are represented at step S81 in vector, from one template to another. At step S82, the user sets initial values of the correlation vector representing the class to give representative vectors (C1 to Computer unit 3).

At step S83, it is verified whether or not the processing has been performed on the entire vectors. If there is any template to be processed, the program moves to step S84.

At step S84, it is verified whether or not the processing has been performed on the representative vectors in their entirety. If there is any representative vector to be processed, the program moves to step S85 to effect distance evaluation such as inner product calculations of the correlation vector and the representative vectors. The program then reverts to step S84 to repeat the steps S84 and S85 to effect distance evaluation with the representative vectors for the entire correlation vectors. The program then reverts to step S86.

At step S86, classification is made into a class to which belongs the representative vector having the shortest vector-to-vector distance, that is having the high correlation and high similarity. The program then reverts to step S83 to repeat the processing from step S83 to step S86 to effect classification into classes for the correlation vectors in their entirety. The program then moves to step S87.

At step S87, the average value is calculated in the same class to find new representative vectors C1' to C3'.

At the next step S88, distance evaluation, exemplified by inner product calculation, is performed between the newly found representative vectors C1' to C3' and the original representative vectors C1 to C3. If the change in the representative vector is below a certain value, the program moves to step S89 to determine this representative vector as answer to terminate the processing.

Figure 25:
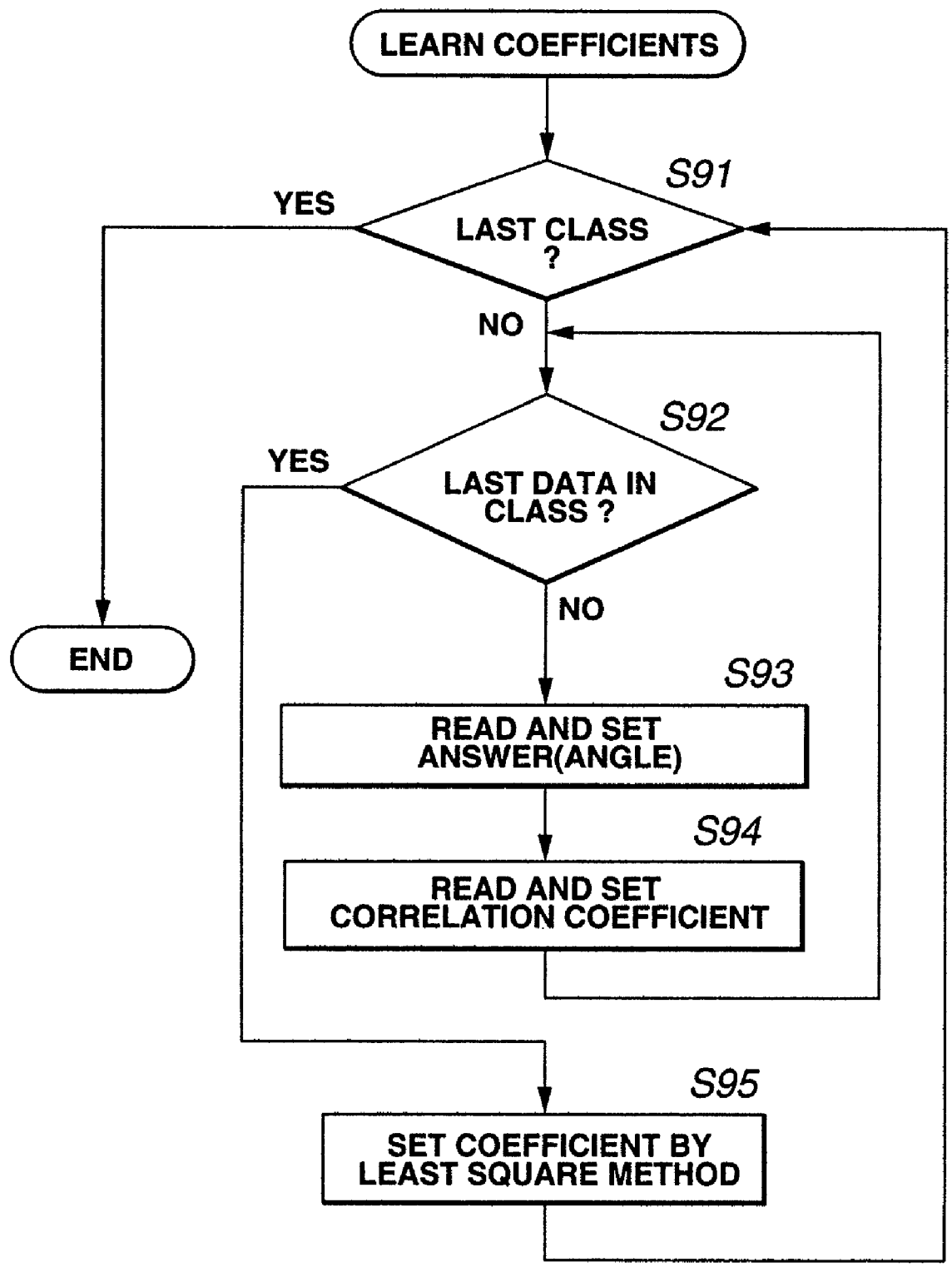
FIG. 25 is a flowchart showing prediction coefficient decision processing.
Figure 26:
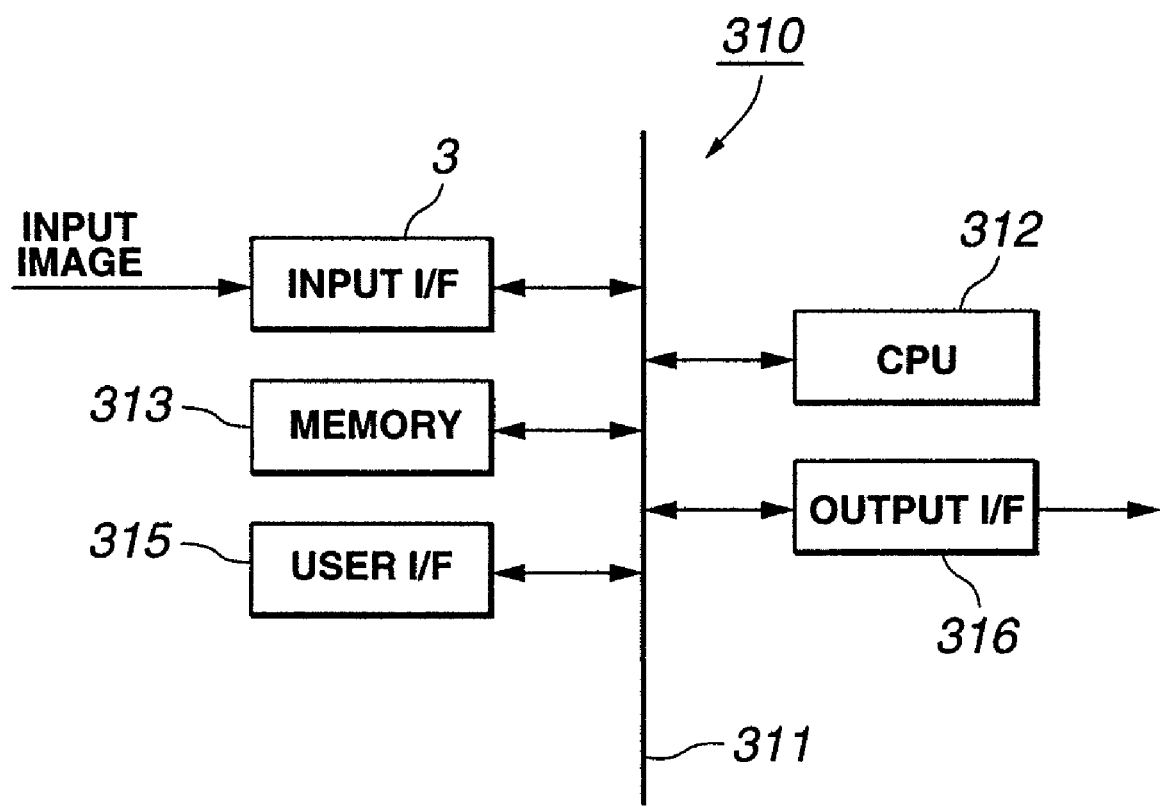
FIG. 26 is a block diagram showing a computer system used as a calculating device in the image processing apparatus.

The class-based coefficient set learning processing is carried out by classifying the total learning data into classes, and by learning the coefficient set for the data of the same class by the least square method, in accordance with, for example, the sequence of the flowchart of FIG. 25.

That is, in the class-based coefficient set learning processing, it is first verified at step S91 for all of classes. If there is any class to be processed, the program moves to step S92 where it is checked whether or not all of data in the class being processed have been processed. If there is any data to be processed, the program moves to step S93.

At step S93, teacher data (angle è) is read in and introduced into a normalization equation. At the next step S94, the representative vectors C1 to C3 are read in and introduced into a normalization equation. The program then reverts to step S92 to repeat the processing of from step S92 to step S94 to generate the normalization equation for the entire data in the class being processed. The program then moves to step S95.

At step S95, the normalization equation is solved by the least square method to determine the coefficient set w1 to w3 of the class under consideration.

At the next step S96, the next class is designated. The program then reverts to step S91 to repeat the processing from step S91 to step S96 to determine the coefficient set w1 to w3 for all of the sets. This completes the learning processing.

Although the object in the above processing is a human face, the present invention can be applied to detection of orientation of an object other than the human being. The distance between the images can be measured by a method other than the correlation method.

As the processing device 3 for performing the above-described processing, a routine computer system 310, made up of a CPU (central processing unit) 312, a memory 313, an input interface 314, a user interface 315 and an output interface 316, interconnected over a bus 311, is used. What is furnished to a user is a recording medium having recorded thereon a computer-controllable program adapted for realizing the functions of the processing device 3, that is an image processing program adapted for executing image processing in accordance with the flowchart shown in FIG. 3. The image processing program includes, for example, a representative face preparing program, for preparing a representative face in accordance with the flowcharts shown in FIGS. 5 and 12, a face position decision program for effecting face position decision processing in accordance with the flowchart of FIG. 14, and a face angle decision program for effecting face angle decision processing in accordance with the flowchart of FIG. 18. The image processing program also includes a class classification processing program for effecting classification into classes in accordance with the flowcharts of FIGS. 23 and 24, and a learning processing program for effecting learning processing of coefficient sets in accordance with the flowchart of FIG. 25. The recording medium may be exemplified by a transmission medium over networks, such as the Internet or the digital satellite, in addition to the information recording mediums, such as magnetic disc or CD-ROM.

According to the present invention, in which the groups of the input image data is determined, based on the smaller number of the images of the representative faces, prepared from plural templates, and on the distance from the input image data, and the angle of the input image is calculated based on the so-determined group, the object angle can be found readily and quickly.

That is, in a representative sample generating method for generating representative sample data of a plurality of groups, based on a plurality of sample data initially classified into the plural groups, group feature data representing feature of sample data are detected in each of the groups, the distances between all of the sample data and the group feature data of each group are detected, all of the sample data are re-classified into the plural groups based on the distances, and the group feature data detection and the re-classification are repeated until the number of the sample data classified into groups different from the previous group is converged by the re-classification. It is therefore possible to change the images of the representative samples, for example, the representative faces, as time elapses, such that an optimum representative face can be prepared automatically with lapse of time. When desired to obtain an image of a pre-fixed representative face, an image of the optimum representative face can be found automatically.

According to the present invention, adaptive grouping is possible, with the grouping criterium being changed on-line, so that changes in the population can be coped with flexibly. The learning function is imparted by the recursive structure to realize the optimum classification technique automatically.

In the sample feature data generating method according to the present invention, the distance between input sample data and each representative sample data generated previously for each of a plurality of groups are detected, the input sample data are classified into one of the classes, based on the distances of the input sample data from representative sample data of the plural groups, and sample feature data representing the feature of the input sample data are generated in accordance with a system pre-set for each class. That is, according to the present invention, linear prediction values are not used directly, but are used as parameters, and are associated with the actually sensed values, so that, if non-linear elements are mixed into e.g., the same class, learning by the linear prediction equation is possible on the condition that the non-linear elements can be converted into linear elements using e.g., a linear-non-linear conversion table, thereby reducing the influence of the non-linear elements.

Moreover, according to the present invention, linear prediction values are not used directly, but are used as parameters, and are associated with the actually sensed values, so that, if non-linear elements are mixed into e.g., the same class, the influence of the non-linear elements can be absorbed using e.g. the linear-non-linear conversion table.

The invention claimed is:

1. An image processing method for building a database of facial orientation image templates, comprising:
    generating a plurality of facial images oriented in different directions;
    providing a range for each image of said plurality of facial images;
    determining an orientation angle for said each image by detecting and calculating distances among predetermined features within the range;
    linking the determined orientation angle to said each image; and
    storing said plurality of facial images linked to orientation angles as facial orientation image templates in the database.

2. The image processing method of claim 1, wherein said providing a range comprises
    extracting a rectangle including both eyes and a nose.

3. The image processing method of claim 2, further comprising specifying positions of both eyes and the nose.

4. The image processing method of claim 3, wherein said determining an orientation angle comprises
    calculating a center of gravity of an area specified by the positions of both eyes and the nose by entering the area within the rectangle.

5. The image processing method of claim 1, further comprising classifying the plurality of facial images into a plurality of face classes depending on orientation angles.

6. The image processing method of claim 5, wherein said classifying the plurality of facial images comprises
    classifying the plurality of facial images into three face classes, oriented toward front, right, and left.

7. The image processing method of claim 5, further comprising:
    calculating a representative facial image for each class of said plurality of face classes by calculating a mean value of facial images in each class.

8. The image processing method of claim 7, wherein said calculating a representative facial image for each class comprises
    averaging each facial image by registering the positions of both eyes according to several facial orientation image templates to account for differences in effective areas among said plurality of face classes.

9. The image processing method of claim 7, wherein said calculating a representative facial image for each class comprises
    calculating a correlative value for the representative facial image.

10. The image processing method of claim 9, further comprising classifying the representative facial image into one of said plurality of face classes, where said one of said plurality of face classes includes facial images having the correlative value above a predetermined threshold value.

* * * * *